(12) United States Patent
Fujimura et al.

(10) Patent No.: US 12,204,306 B2
(45) Date of Patent: Jan. 21, 2025

(54) CONTROL SYSTEM, SUPPORT DEVICE, AND SUPPORT PROGRAM

(71) Applicant: OMRON CORPORATION, Kyoto (JP)

(72) Inventors: Ryosuke Fujimura, Kyoto (JP); Hiromu Suganuma, Kyoto (JP); Hiromi Ishihara, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 376 days.

(21) Appl. No.: 17/765,550

(22) PCT Filed: Mar. 3, 2020

(86) PCT No.: PCT/JP2020/008948
§ 371 (c)(1),
(2) Date: Mar. 31, 2022

(87) PCT Pub. No.: WO2021/065032
PCT Pub. Date: Apr. 8, 2021

(65) Prior Publication Data
US 2022/0342380 A1 Oct. 27, 2022

(30) Foreign Application Priority Data
Oct. 3, 2019 (JP) .................................. 2019-183162

(51) Int. Cl.
*G05B 19/05* (2006.01)
(52) U.S. Cl.
CPC ......... *G05B 19/058* (2013.01); *G05B 19/054* (2013.01); *G05B 2219/1215* (2013.01)

(58) Field of Classification Search
CPC ................ G05B 19/058; G05B 19/054; G05B 2219/1215
(Continued)

(56) References Cited

U.S. PATENT DOCUMENTS 7,603,183 B1 * 10/2009 Munemoto .......... G05B 19/056
 700/83
9,922,179 B2 * 3/2018 Son ......................... G06F 3/011
(Continued)

FOREIGN PATENT DOCUMENTS

CN 104160344 A 11/2014
CN 104603701 A 5/2015
(Continued)

OTHER PUBLICATIONS

Chinese Office Action issued Feb. 28, 2024 in Application No. 202080067978.3.
(Continued)

*Primary Examiner* — Md Azad
(74) *Attorney, Agent, or Firm* — Sughrue Mion, PLLC

(57) ABSTRACT

A control system includes a support device used for developing a user program to be executed on a controller, and a display device that provides a supervisory control screen by referring to information held by the controller. The support device extracts a relationship between an output signal and one or more input signals defined by the user program and generates input-output correspondence information, and transmits the input-output correspondence information or screen data reflecting the input-output correspondence information to the display device. The display device provides,
(Continued)

on the basis of the input-output correspondence information or the screen data reflecting the input-output correspondence information, the supervisory control screen showing the current value of a selected output signal and the current value of one or more input signals associated with the output signal by referring to the values of input and output signals held by the controller.

19 Claims, 20 Drawing Sheets

(58) Field of Classification Search
USPC .......................................................... 700/18
See application file for complete search history.

(56) References Cited

U.S. PATENT DOCUMENTS

| | | | | |
|---|---|---|---|---|
| 2014/0304551 | A1* | 10/2014 | Nakai | G06F 11/3692 |
| | | | | 714/38.1 |
| 2015/0234753 | A1 | 8/2015 | Tokito et al. | |
| 2016/0357177 | A1 | 12/2016 | Chand et al. | |
| 2017/0261970 | A1 | 9/2017 | Fujimura et al. | |
| 2018/0259925 | A1* | 9/2018 | Fujimura | B25J 9/1674 |
| 2018/0259926 | A1 | 9/2018 | Fujimura et al. | |
| 2019/0121342 | A1* | 4/2019 | Cella | G06N 3/047 |
| 2019/0204792 | A1* | 7/2019 | Kanaya | G05B 19/0425 |

FOREIGN PATENT DOCUMENTS

| | | |
|---|---|---|
| JP | 2006-309565 A | 11/2006 |
| JP | 2012-256178 A | 12/2012 |
| JP | 2013-105218 A | 5/2013 |
| JP | 2017-167653 A | 9/2017 |
| JP | 2018-151866 A | 9/2018 |
| JP | 2018-152032 A | 9/2018 |
| WO | 2007/086113 A1 | 8/2007 |
| WO | 2014/097379 A1 | 6/2014 |

OTHER PUBLICATIONS

International Search Report for PCT/JP2020/008948 dated Jun. 2, 2020 [PCT/ISA/210].
Written Opinion for PCT/JP2020/008948 dated Jun. 2, 2020 [PCT/ISA/237].
Japanese Office Action issued Jul. 4, 2023 in Application No. 2019-183162.

* cited by examiner

FIG.19

| FUNCTION SHARING | (1) FUNCTION OF GENERATING INPUT-OUTPUT CORRESPONDENCE INFORMATION | (2) FUNCTION OF STORING GENERATED INPUT-OUTPUT CORRESPONDENCE INFORMATION | (3) FUNCTION OF GENERATING MONITOR SCREEN ON THE BASIS OF INPUT-OUTPUT CORRESPONDENCE INFORMATION |
|---|---|---|---|
| 1 | SUPPORT DEVICE | DISPLAY DEVICE | DISPLAY DEVICE |
| 2 | SUPPORT DEVICE | SAFETY CONTROLLER | DISPLAY DEVICE |
| 3 | SUPPORT DEVICE | STANDARD CONTROLLER | DISPLAY DEVICE |
| 4 | SUPPORT DEVICE | INTEGRATED CONTROLLER | INTEGRATED CONTROLLER |
| 5 | SUPPORT DEVICE | — | DISPLAY DEVICE |
| 6 | SUPPORT DEVICE | — | INTEGRATED CONTROLLER |
| 7 | DISPLAY DEVICE | — | DISPLAY DEVICE |
| 8 | SAFETY CONTROLLER | SAFETY CONTROLLER | DISPLAY DEVICE |

CONTROL SYSTEM, SUPPORT DEVICE, AND SUPPORT PROGRAM

CROSS REFERENCE TO RELATED APPLICATIONS

This application is a National Stage of International Application No. PCT/JP2020/008948 filed Mar. 3, 2020, claiming priority based on Japanese Patent Application No. 2019-183162 filed Oct. 3, 2019, the entire contents of each of which being herein incorporated by reference in their entireties.

TECHNICAL FIELD

The present invention relates to a control system, a support device, and a support program.

BACKGROUND ART

In a control device such as a programmable controller (PLC) or a safety controller, a value of one or more output signals is cyclically determined from one or more input signals in accordance with a control logic specified by a user program.

For example, Japanese Patent Laying-Open No. 2017-167653 (PTL 1) and Japanese Patent Laying-Open No. 2018-151866 (PTL 2) disclose techniques for analyzing and evaluating a relationship between one or more input signals and one or more output signals.

CITATION LIST

Patent Literature

PTL 1: Japanese Patent Laying-Open No. 2017-167653
PTL 2: Japanese Patent Laying-Open No. 2018-151866

SUMMARY OF INVENTION

Technical Problem

The techniques disclosed in PTL 1 and PTL 2 described above are typically implemented by an information processing device called a support device. While a facility is in operation, the support device is not often connected to the control device.

When an unintended system shutdown occurs while the facility is in operation, it takes some time and effort to connect the support device for finding the cause, thereby requiring much more time in finding the cause. Such an unintended system shutdown may occur, for example, due to erroneous determination such as a case where a foreign matter (such as an insect or a piece of metal being machined) enters a light projecting/receiving range of a light curtain and is determined to be abnormal, a mechanical failure, or the like.

Therefore, there is a demand for a solution that allows a cause to be found quickly when an unintended system shutdown occurs.

Solution to Problem

A control system according to an embodiment of the present invention includes a support device used for developing a user program to be executed on a controller, and a display device configured to provide a supervisory control screen by referring to information held by the controller. The support device includes a generation means configured to extract a relationship between an output signal and one or more input signals defined by the user program and generate input-output correspondence information, and a transmission means configured to transmit the input-output correspondence information or screen data reflecting the input-output correspondence information to the display device. The display device provides, on the basis of the input-output correspondence information or the screen data reflecting the input-output correspondence information, the supervisory control screen showing a current value of a selected output signal and a current value of one or more input signals associated with the output signal by referring to values of input and output signals held by the controller.

According to this configuration, it is possible to easily and quickly acquire information used for finding a cause of an unintended system shutdown by referring to the supervisory control screen provided from the display device without connecting the support device to the controller.

The input-output correspondence information may include an address used for referring to a value of a corresponding one of the input and output signals, and information used for identifying the one or more input signals associated with the output signal. According to this configuration, the display device can uniquely identify the input signal associated with each output signal and can uniquely identify a location from which the value of a corresponding one of the input and output signals is acquired.

The display device may include a screen generation means configured to generate the supervisory control screen on the basis of the input-output correspondence information. According to this configuration, the supervisory control screen is generated from the input-output correspondence information transmitted to the display device, so that it is possible to reduce time and effort spent on the creation of the supervisory control screen.

The transmission means may transmit the input-output correspondence information in addition to the screen data used for providing a desired supervisory control screen on the display device. According to this configuration, the input-output correspondence information is transmitted to the display device in accordance with the procedure of transmitting the screen data to the display device, which prevents an increase in operator's time and effort.

The screen data reflecting the input-output correspondence information may be structured to show a current value of one or more input signals associated with any selected output signal generated on the basis of the input-output correspondence information. According to this configuration, the screen data generated on the basis of the input-output correspondence information is transmitted to the display device, so that it is possible to skip the processing of generating the supervisory control screen and thus speed up the processing related to the display.

The controller may include a safety controller, and the input-output correspondence information may include a safety signature showing identity with a user program executed on the safety controller. According to this configuration, it is possible to satisfy requirements for the safety controller.

The generation means may trace back the user program to identify, for each output signal included in the user program, one or more input signals for determining a value of the output signal. According to this configuration, it is possible to easily identify a correspondence relationship between an output signal and one or more input signals included in the user program.

A controller serving as a communication slave may exchange data via a controller serving as a communication master, and the display device may refer to values of input and output signals held by the controller serving as the communication slave via the controller serving as the communication master. According to this configuration, it is possible for the control system including the communication master and the communication slave to provide the supervisory control screen.

According to another embodiment of the present invention, a support device used for developing a user program to be executed on a controller is provided. The controller is connected with a display device configured to provide a supervisory control screen by referring to information held by the controller. The support device includes a generation means configured to extract a relationship between an output signal and one or more input signals defined by the user program and generate input-output correspondence information, and a transmission means configured to transmit the input-output correspondence information or screen data reflecting the input-output correspondence information to the display device. The display device provides, on the basis of the input-output correspondence information or the screen data reflecting the input-output correspondence information, the supervisory control screen showing a current value of a selected output signal and a current value of one or more input signals associated with the output signal by referring to values of input and output signals held by the controller.

According to still another embodiment of the present invention, a support program used for developing a user program to be executed on a controller is provided. The controller is connected with a display device configured to provide a supervisory control screen by referring to information held by the controller. The support program causes a computer to execute extracting a relationship between an output signal and one or more input signals defined by the user program and generating input-output correspondence information, and transmitting the input-output correspondence information or screen data reflecting the input-output correspondence information to the display device. The display device provides, on the basis of the input-output correspondence information or the screen data reflecting the input-output correspondence information, the supervisory control screen showing a current value of a selected output signal and a current value of one or more input signals associated with the output signal by referring to values of input and output signals held by the controller.

Advantageous Effects of Invention

According to the present invention, it is possible to provide a solution that allows a cause to be found quickly when an unintended system shutdown occurs.

BRIEF DESCRIPTION OF DRAWINGS

FIG. 19 is a diagram illustrating an example of function sharing in the control system according to the present embodiment.

DESCRIPTION OF EMBODIMENTS

Figure 1:
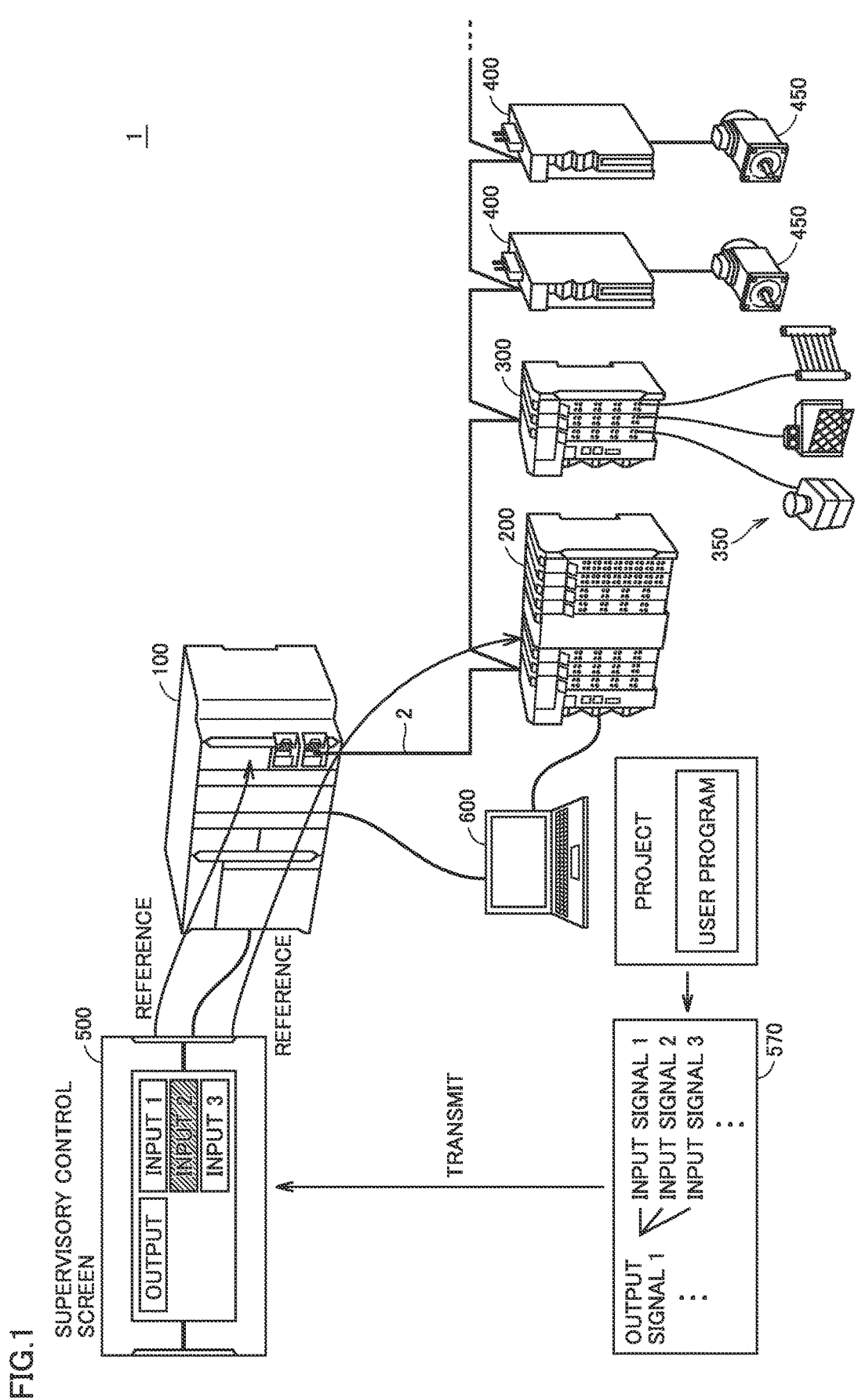
FIG. 1 is a diagram schematically illustrating an example of a case to which the present invention is applied.

Embodiments of the present invention will be described in detail with reference to the drawings. Note that the same or corresponding parts in the drawings are denoted by the same reference numerals, and no redundant description will be given of such parts.

A. Application Example

First, an example of a case to which the present invention is applied will be described.

FIG. 1 is a diagram schematically illustrating an example of a case to which the present invention is applied. With reference to FIG. 1, a control system 1 includes, as an example of a controller, a standard controller 100 and a safety controller 200. On standard controller 100 and safety controller 200, a user program is executed.

Herein, the "user program" is a set of instructions that defines a control operation (control logic) to be executed on the controller, and is created to adapt to a control target. In the following description, a user program executed on standard controller 100 is referred to as a standard control program, and a user program executed on safety controller 200 is referred to as a safety program. Control system 1 includes a support device 600 used for developing such user programs.

Control system 1 further includes a display device 500 that provides a supervisory control screen by referring to information held by the controller.

Herein, the "supervisory control screen" means a user interface that presents, to a user, a state of the control target including information held by the controller and the like and is capable of receiving a user operation.

In the present application example, support device 600 executes processing of extracting a relationship between an output signal and one or more input signals defined by the user program and generating input-output correspondence information 570. Support device 600 executes processing of transmitting input-output correspondence information 570 or screen data reflecting input-output correspondence information 570 to display device 500.

Display device 500 provides, on the basis of input-output correspondence information 570 or the screen data reflecting input-output correspondence information 570, the supervisory control screen showing the current value of a selected output signal and the current value of one or more input signals associated with the output signal by referring to the values of input and output signals held by the controller (standard controller 100 and safety controller 200).

Such a configuration allows, even when an unintended system shutdown occurs, a cause of the system shutdown (for example, the value of any of the input signals is abnormal) to be easily and quickly identified by referring to the supervisory control screen presented on display device 500 without using support device 600.

Herein, the "input signal" includes a signal input, from the control target or the like, to an input unit connected to the controller directly or over a network. Examples of the input signal include an ON/OFF signal (digital input) detected by a photoelectric sensor or the like, a physical signal (analog input) detected by a temperature sensor or the like, and a pulse signal (pulse input) generated by a pulse encoder or the like. A description of the following embodiment will be given on the assumption that the user program is developed in a variable programming environment, and thus, an "input variable" indicating the value of each input signal is treated as being substantially equivalent to the "input signal".

Herein, the "output signal" includes a signal output from an output unit connected to the controller directly or over a network. Examples of the output signal include an ON/OFF signal (digital output) for driving a relay or the like, a speed command (analog output) indicating a rotation speed of a servomotor or the like, and a displacement command (pulse output) indicating a movement amount of a stepping motor or the like. The description of the following embodiment will be given on the assumption that the user program is developed in a variable programming environment, and thus, an "output variable" indicating the value of each output is treated as being substantially equivalent to the "output signal".

B. Control System 1

Figure 2:
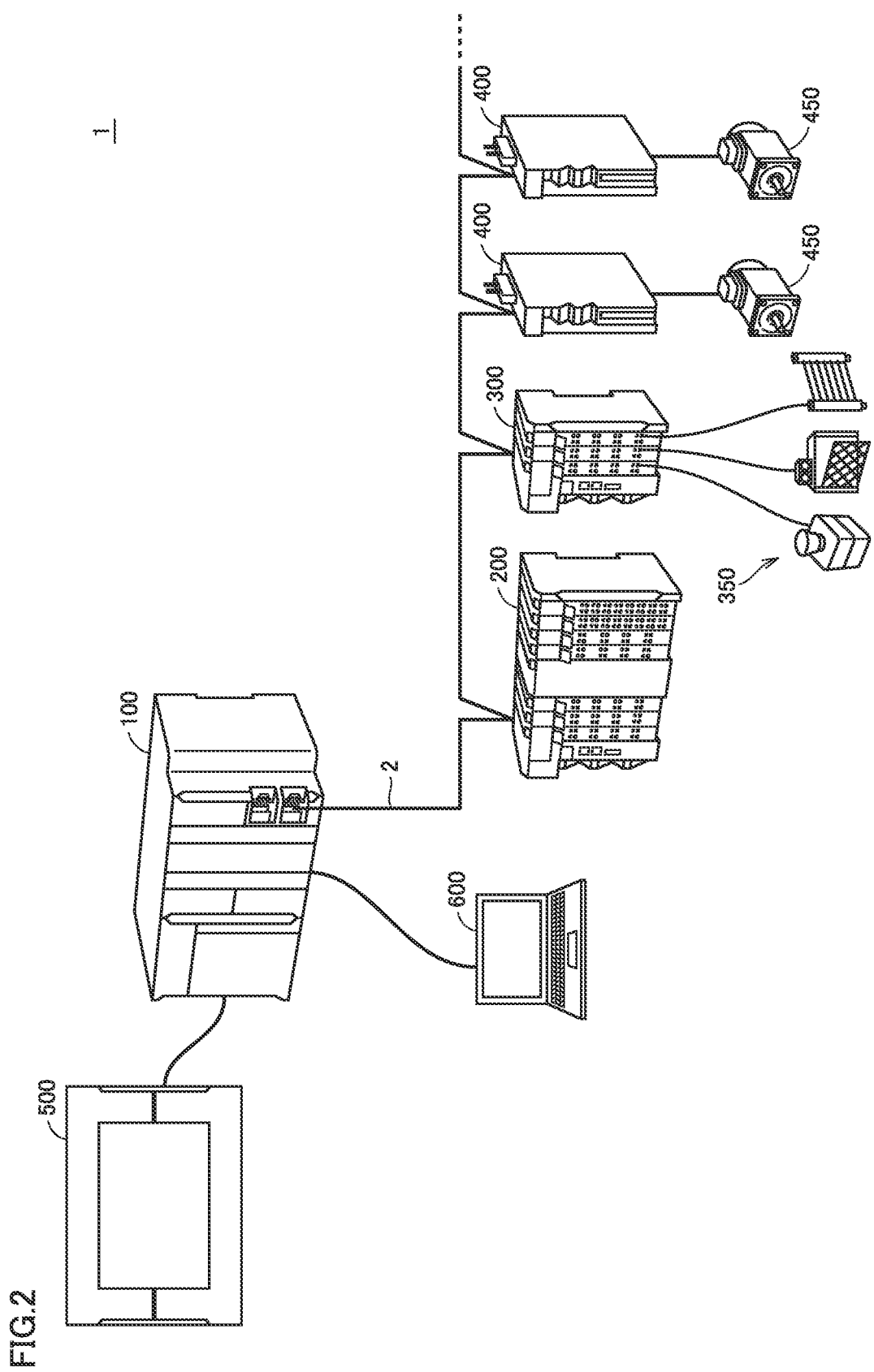
FIG. 2 is a diagram schematically illustrating an example of a configuration of a control system according to the present embodiment.

Next, an example of a configuration of control system 1 according to the present embodiment will be described. FIG. 2 is a diagram schematically illustrating an example of the configuration of control system 1 according to the present embodiment.

With reference to FIG. 2, control system 1 primarily includes standard controller 100, and safety controller 200, a safety slave coupler 300, and one or more safety drivers 400 connected to standard controller 100 over a field network 2.

EtherCAT (registered trademark) may be used as an example of the protocol used on field network 2.

Standard controller 100 executes standard control on a desired control target in accordance with a standard control program created in advance. Safety controller 200 executes safety control on a desired control target independently of standard controller 100.

Herein, the "standard control" is a generic name for processing of controlling the control target in accordance with a predetermined required specification. On the other hand, the "safety control" is a generic name for processing of preventing the safety of a person from being threatened by a facility, a machine, or the like. The "safety control" is designed to satisfy requirements for implementing the safety function defined by IEC 61508 or the like.

Safety slave coupler 300 is capable of transferring an input signal received from a desired safety device 350 to safety controller 200 and/or transferring a command from safety controller 200 to a desired safety device 350. Note that safety device 350 may be directly connected to safety controller 200.

Safety driver 400 drives servomotor 450 electrically connected to safety driver 400. Safety driver 400 also has a safety function related to driving of servomotor 450.

Display device 500 and/or support device 600 is connectable to standard controller 100.

Display device 500 is also referred to as a human machine interface (HMI) or a programmable terminal (PT), and display device 500 provides the supervisory control screen by referring to information held by the controller (standard controller 100 and/or safety controller 200) and sends a command corresponding to a user operation to standard controller 100.

Support device 600 provides an environment in which the user program (a standard control program 1104 and/or a safety program 2104) executed on the controller (standard controller 100 and/or safety controller 200) is developed. Support device 600 may provide a support function of making various settings necessary for the operation of control system 1 in addition to creating or modifying the program executed on standard controller 100 and/or safety controller 200.

C. Example of Configuration of Device Included in Control System 1

Next, an example of a configuration of a device included in control system 1 will be described.

c1: Standard Controller 100

Figure 3:
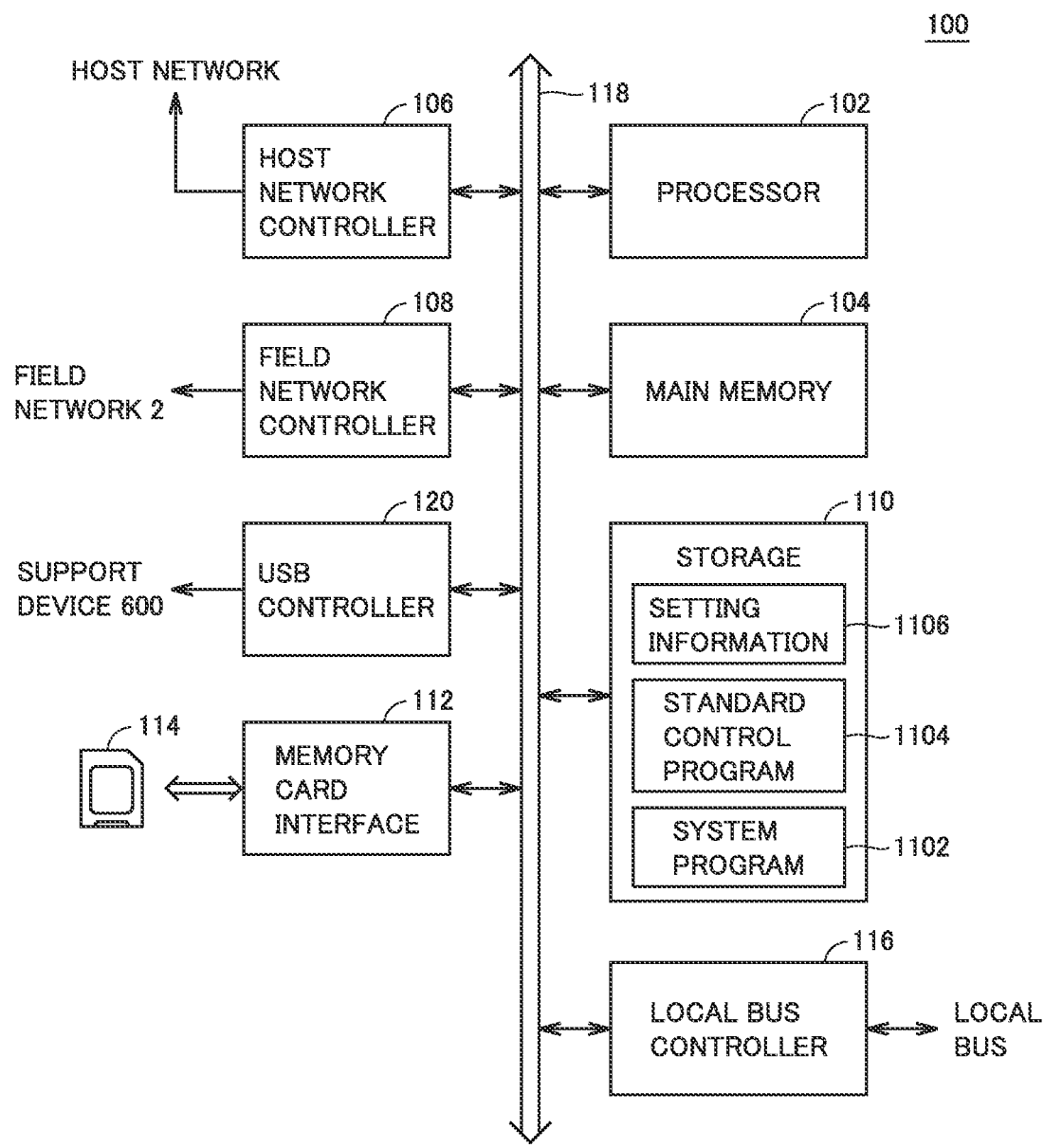
FIG. 3 is a diagram schematically illustrating an example of a hardware configuration of a standard controller that is a part of the control system according to the present embodiment.

FIG. 3 is a diagram schematically illustrating an example of a hardware configuration of standard controller 100 that is a part of control system 1 according to the present embodiment. As illustrated in FIG. 3, standard controller 100 includes a processor 102, a main memory 104, a storage 110, a host network controller 106, a field network controller 108, a universal serial bus (USB) controller 120, a memory card interface 112, and a local bus controller 116. Such components are connected over a processor bus 118.

Processor 102 primarily serves as an operation processor that executes a control operation related to the standard control, and includes a central processing unit (CPU), a graphics processing unit (GPU), or the like. Specifically, processor 102 reads a program (for example, a system program 1102 and standard control program 1104) stored in storage 110, loads the program into main memory 104, and executes the program, thereby enabling the control operation and various processing as described later to be executed in a manner that depends on the control target.

Main memory 104 includes a volatile storage device such as a dynamic random access memory (DRAM) or a static random access memory (SRAM). Storage 110 includes, for example, a non-volatile storage device such as a solid state drive (SSD) or a hard disk drive (HDD).

Storage 110 stores system program 1102 via which basic functions are implemented, standard control program 1104 created to adapt to the control target, and setting information 1106 for defining processing to be executed on standard controller 100.

Host network controller 106 exchanges data with a desired information processor over a host network.

Field network controller 108 exchanges data with a desired device over field network 2. In the configuration illustrated in FIG. 2, field network controller 108 serves as a communication master of field network 2.

USB controller 120 exchanges data with support device 600 or the like over a USB connection.

Memory card interface 112 receives memory card 114 that is an example of a removable storage medium. Memory card interface 112 can read and write desired data from and to memory card 114.

Local bus controller 116 exchanges data with a desired unit connected to standard controller 100 over a local bus.

c2: Safety Controller 200

Figure 4:
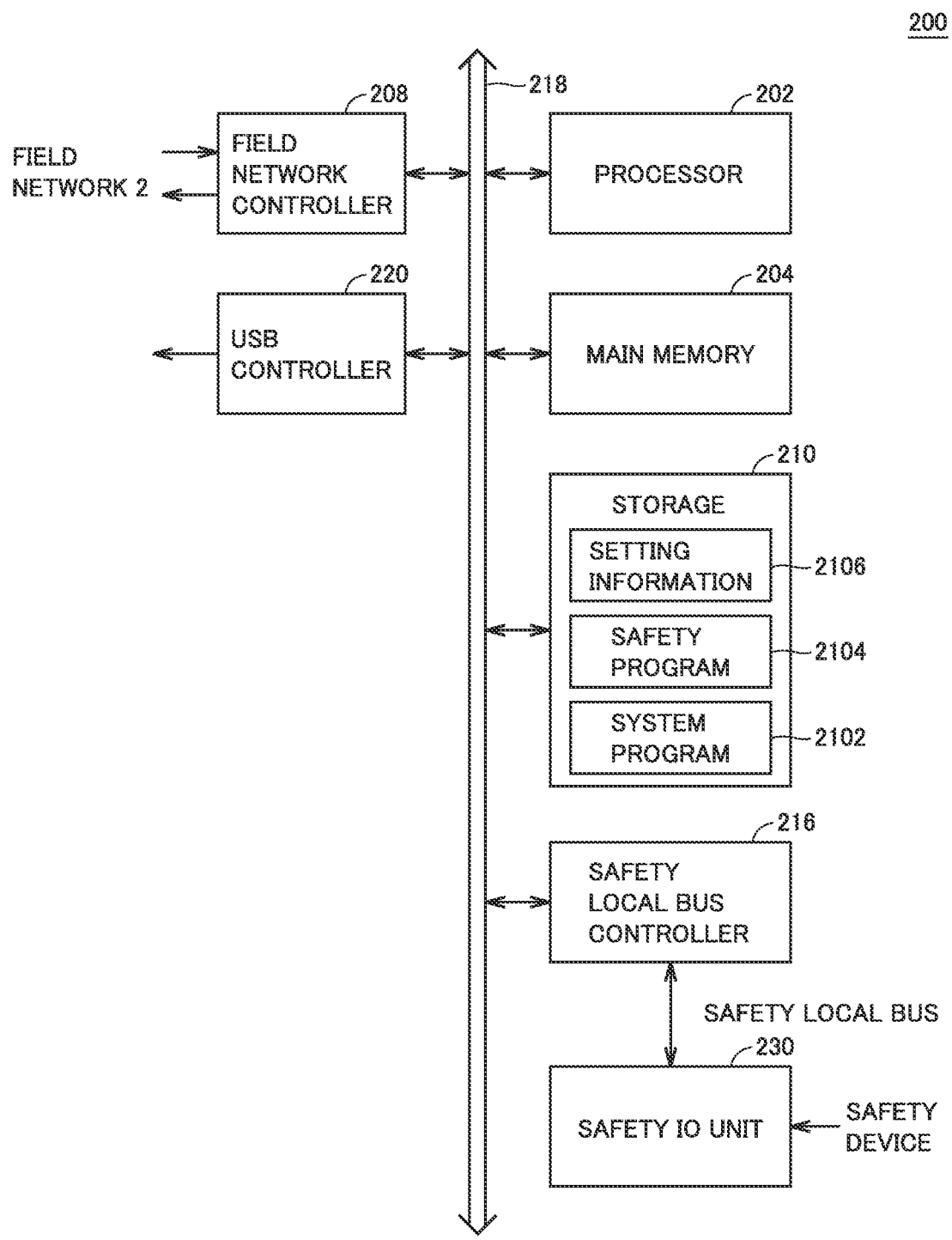
FIG. 4 is a diagram schematically illustrating an example of a hardware configuration of a safety controller that is a part of the control system according to the present embodiment.

FIG. 4 is a diagram schematically illustrating an example of a hardware configuration of safety controller 200 that is a part of control system 1 according to the present embodiment. With reference to FIG. 4, safety controller 200 includes a processor 202, a main memory 204, a storage 210, a field network controller 208, a USB controller 220, and a safety local bus controller 216. Such components are connected over a processor bus 218.

Processor 202 primarily serves as an operation processor that executes a control operation related to the safety control, and includes a CPU, a GPU, or the like.

Main memory 204 includes a volatile storage device such as a DRAM or an SRAM. Storage 210 includes, for example, a non-volatile storage device such as an SSD or an HDD.

Storage 210 stores a system program 2102 via which basic functions are implemented, safety program 2104 created to adapt to the required safety function, and setting information 2106 for defining processing to be executed on safety controller 200.

Field network controller 208 exchanges data with a desired device over field network 2. In the configuration illustrated in FIG. 2, field network controller 208 serves as a communication slave of field network 2.

USB controller 220 exchanges data with support device 600 or the like over a USB connection.

Safety local bus controller 216 exchanges data with a desired safety IO unit 230 connected to safety controller 200 over a safety local bus.

c3: Safety Slave Coupler 300

Figure 5:
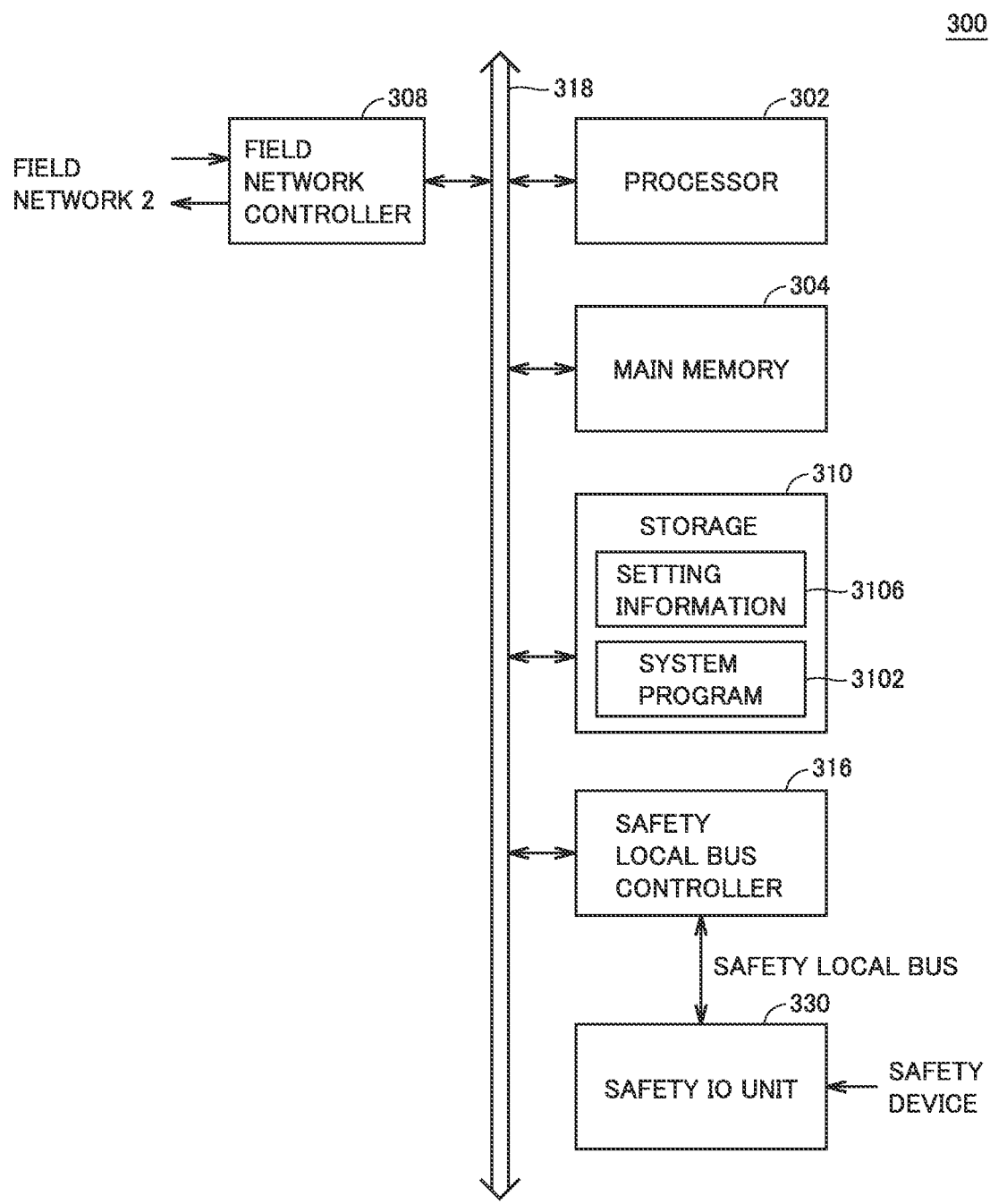
FIG. 5 is a diagram schematically illustrating an example of a hardware configuration of a safety slave coupler that is a part of the control system according to the present embodiment.

FIG. 5 is a diagram schematically illustrating an example of a hardware configuration of safety slave coupler 300 that is a part of control system 1 according to the present embodiment. With reference to FIG. 5, safety slave coupler 300 includes a processor 302, a main memory 304, a storage 310, a field network controller 308, and a safety local bus controller 316. Such components are connected over a processor bus 318.

Processor 302 primarily serves as an operation processor that executes a control operation to operate safety slave coupler 300, and includes a CPU, a GPU, or the like.

Main memory 304 includes a volatile storage device such as a DRAM or an SRAM. Storage 310 includes, for example, a non-volatile storage device such as an SSD or an HDD.

Storage 310 stores a system program 3102 via which basic functions are implemented and setting information 3106 for defining processing to be executed on safety slave coupler 300.

Field network controller 308 exchanges data with a desired device over field network 2. In the configuration illustrated in FIG. 2, field network controller 308 serves as a communication slave of field network 2.

Safety local bus controller 316 exchanges data with a desired safety IO unit 330 connected to safety slave coupler 300 over a safety local bus.

c4: Safety Driver 400 and Servomotor 450

Figure 6:
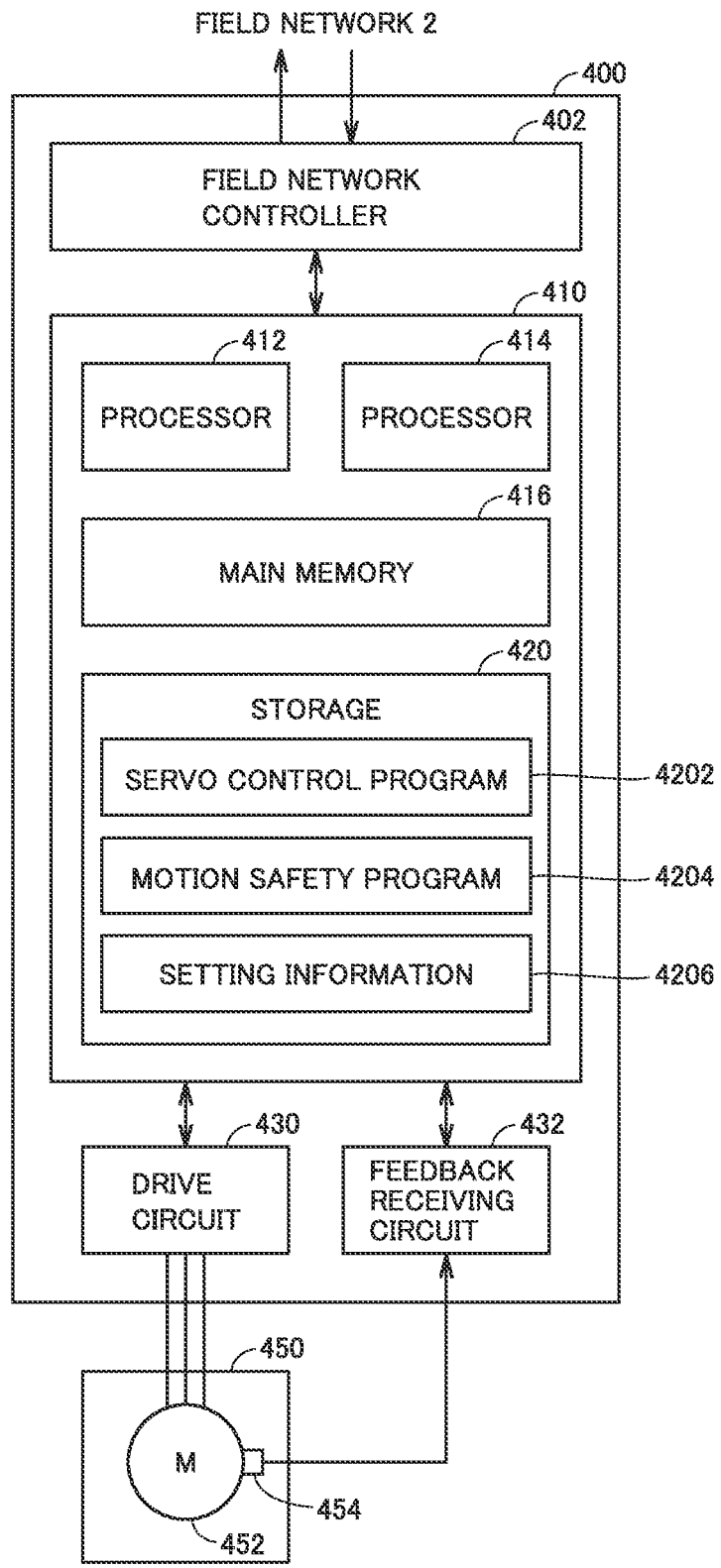
FIG. 6 is a diagram schematically illustrating examples of hardware configurations of a safety driver and a servomotor that are parts of the control system according to the present embodiment.

FIG. 6 is a diagram schematically illustrating examples of hardware configurations of safety driver 400 and servomotor 450 that are parts of control system 1 according to the present embodiment. With reference to FIG. 6, safety driver 400 includes a field network controller 402, a control unit 410, a drive circuit 430, and a feedback receiving circuit 432.

Control unit 410 executes operation processing necessary for the operation of safety driver 400. As an example, control unit 410 includes processors 412, 414, a main memory 416, and a storage 420. Processor 412 primarily executes a control operation for driving servomotor 450, and processor 414 primarily executes a control operation for providing the safety function related to servomotor 450. Processors 412, 414 each include a CPU or the like. The configuration is not limited to the configuration illustrated in FIG. 6, and may be a configuration including a single processor.

Main memory 416 includes a volatile storage device such as a DRAM or an SRAM. Storage 420 includes, for example, a non-volatile storage device such as an SSD or an HDD.

Storage 420 stores a servo control program 4202 via which servo control is implemented, a motion safety program 4204 via which a motion safety function is implemented, and setting information 4206 for defining processing to be executed on safety driver 400.

Drive circuit 430 includes a converter circuit, an inverter circuit, and the like, and generates power having a designated voltage, current, and phase and supplies the power to servomotor 450 in accordance with a command from control unit 410.

Feedback receiving circuit 432 receives a feedback signal from servomotor 450 and outputs the reception result to control unit 410.

Servomotor 450 typically includes a three-phase AC motor 452 and an encoder 454 attached to a rotation shaft of three-phase AC motor 452.

c5: Display Device 500

Figure 7:
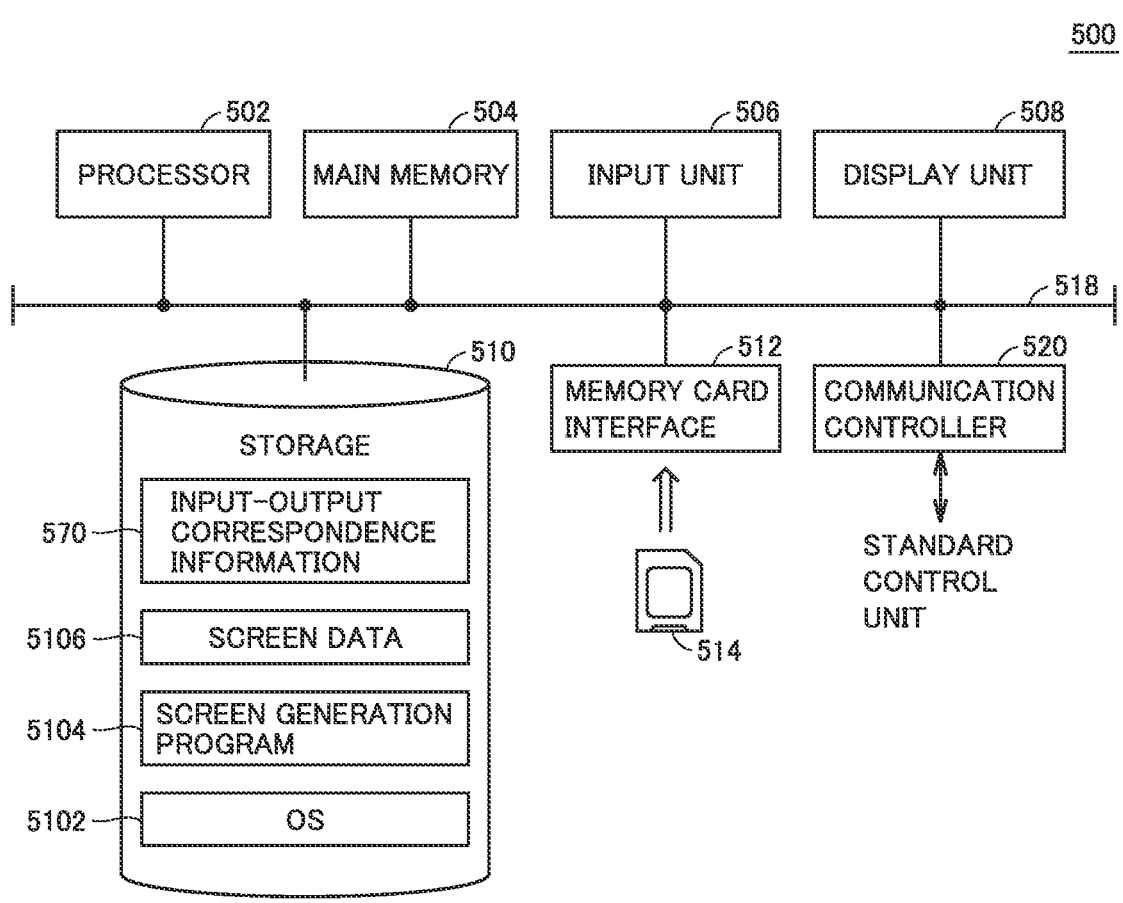
FIG. 7 is a diagram schematically illustrating an example of a hardware configuration of a display device that is a part of the control system according to the present embodiment.

FIG. 7 is a diagram schematically illustrating an example of a hardware configuration of display device 500 that is a part of control system 1 according to the present embodiment. As an example, display device 500 is implemented by hardware (for example, a general-purpose personal computer) adhering to a standard architecture.

With reference to FIG. 7, display device 500 includes a processor 502, a main memory 504, an input unit 506, a display unit 508, a storage 510, a memory card interface 512, and a communication controller 520. Such components are connected over a processor bus 518.

Processor 502 includes a CPU, a GPU, or the like, and reads a program (for example, an operating system (OS) 5102 and a screen generation program 5104) stored in storage 510, loads the program into main memory 504, and executes the program, thereby enabling processing related to display and monitoring to be executed. Storage 510 further stores screen data 5106 and input-output correspondence information 570 (details will be described later).

Main memory 504 includes a volatile storage device such as a DRAM or an SRAM. Storage 510 includes, for example, a non-volatile storage device such as an HDD or an SSD.

Storage 510 stores OS 5102 via which basic functions are implemented and screen data 5106 used for providing a function as display device 500.

Input unit 506 typically includes a touchscreen or the like, and receives a user operation. As input unit 506, a keyboard, a mouse, or the like may be used. Display unit 508 includes a display, various indicators, or the like, and outputs a processing result or the like received from processor 502.

Memory card interface 512 receives memory card 514 that is an example of a removable storage medium. Memory card interface 512 can read and write desired data from and to memory card 514.

Communication controller 520 exchanges data with standard controller 100 or the like via desired local communication.

c6: Support Device 600

Figure 8:
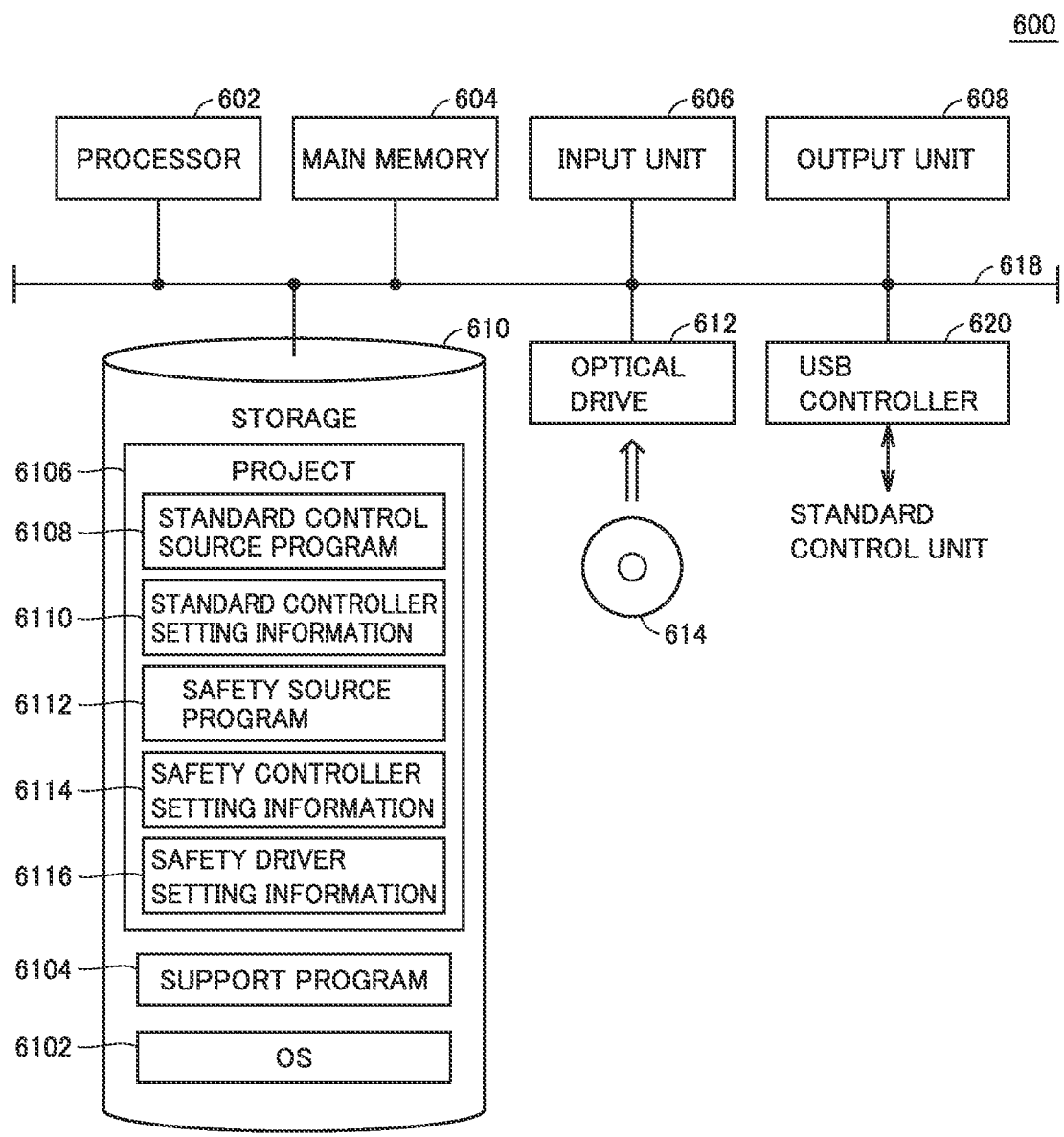
FIG. 8 is a diagram schematically illustrating an example of a hardware configuration of a support device that is a part of the control system according to the present embodiment.

FIG. 8 is a diagram schematically illustrating an example of a hardware configuration of support device 600 that is a part of control system 1 according to the present embodiment. As an example, support device 600 is implemented by hardware (for example, a general-purpose personal computer) adhering to a standard architecture.

With reference to FIG. 8, support device 600 includes a processor 602, a main memory 604, an input unit 606, an output unit 608, a storage 610, an optical drive 612, and a USB controller 620. Such components are connected over a processor bus 618.

Processor 602 includes a CPU, a GPU, or the like, and reads a program (for example, an OS 6102 and a support program 6104) stored in storage 610, loads the program into main memory 604, and executes the program, thereby enabling various processing as described later to be executed.

Main memory 604 includes a volatile storage device such as a DRAM or an SRAM. Storage 610 includes, for example, a non-volatile storage device such as an HDD or an SSD.

Storage 610 stores OS 6102 via which basic functions are implemented, support program 6104 for providing a function as support device 600, and project data 6106 created by a user in a development environment.

Support device 600 provides a development environment in which settings of each device included in control system 1 and creation of a program to be executed on each device can be made in an integrated manner. Project data 6106 includes data generated in such an integrated development environment. Typically, project data 6106 includes a standard control source program 6108, standard controller setting information 6110, a safety source program 6112, safety controller setting information 6114, and safety driver setting information 6116.

Standard control source program 6108 is converted into an object code, transmitted to standard controller 100, and stored as a standard control program 1104 (see FIG. 3). Similarly, standard controller setting information 6110 is transmitted to standard controller 100 and stored as setting information 1106 (see FIG. 3).

Safety source program 6112 is converted into an object code, transmitted to safety controller 200, and stored as safety program 2104 (see FIG. 4). Similarly, safety controller setting information 6114 is transmitted to safety controller 200 and stored as setting information 2106 (see FIG. 4).

Safety driver setting information 6116 is transmitted to safety driver 400 and stored as setting information 4206 (see FIG. 6).

Input unit 606 includes a keyboard, a mouse, or the like, and receives a user operation. Output unit 608 includes a display, various indicators, a printer, or the like, and outputs a processing result or the like received from processor 602.

USB controller 620 exchanges data with standard controller 100 or the like over a USB connection.

Support device 600 includes optical drive 612 so as to allow a computer-readable program stored in a non-transitory storage medium 614 (for example, an optical storage medium such as a digital versatile disc (DVD)) to be read and installed in storage 610 or the like.

Support program 6104 or the like executed on support device 600 may be installed via computer-readable storage medium 614, or may be downloaded from a server device or the like on a network and then installed. Functions provided by support device 600 according to the present embodiment may be implemented via some of the modules provided by the OS.

Not that support device 600 may be removed from standard controller 100 while control system 1 is in operation.

c7: Other Embodiments

FIGS. 3 to 8 illustrate the configuration examples where one or more processors execute a program to provide necessary functions, but some or all of the functions thus provided may be implemented by a dedicated hardware circuit (for example, an application specific integrated circuit (ASIC), a field-programmable gate array (FPGA), or the like).

Further, core parts of standard controller 100, safety controller 200, and safety slave coupler 300 may be each implemented by hardware (for example, an industrial personal computer based on a general-purpose personal computer) adhering to a standard architecture. Further, a plurality of OSs having different uses may be executed in parallel using a virtualization technology, and a necessary application may be executed on each OS. Furthermore, a configuration where functions such as display device 500 and support device 600 are integrated into standard controller 100 may be employed.

D. Problem

Next, a problem that may occur in control system 1 will be described.

Figure 9:
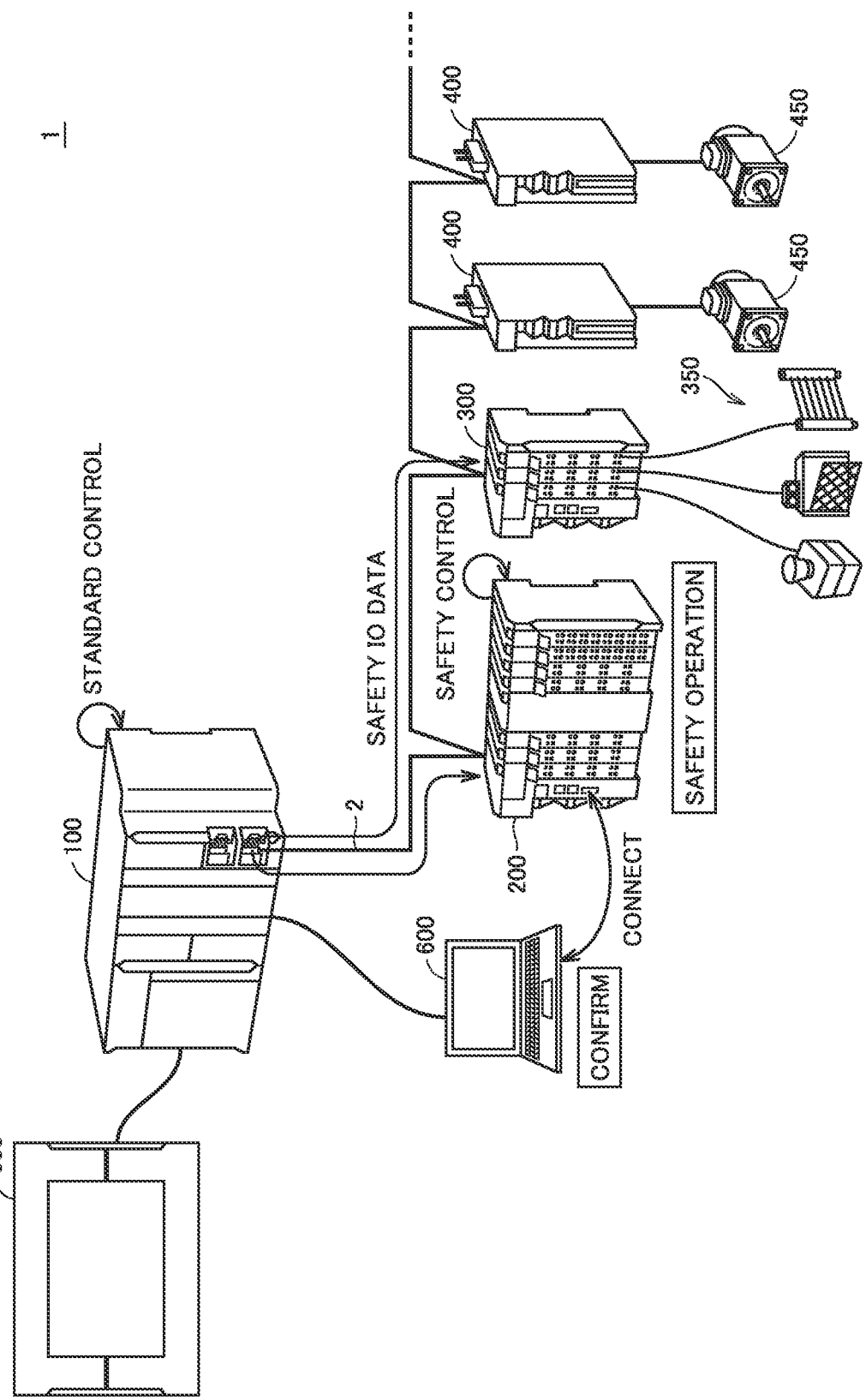
FIG. 9 is a diagram for describing a problem that may occur in the control system.

FIG. 9 is a diagram for describing a problem that may occur in control system 1. With reference to FIG. 9, in control system 1, standard controller 100 executes the standard control, and safety controller 200 executes the safety control.

Safety controller 200 exchanges safety IO data with safety slave coupler 300 and safety driver 400.

When EtherCAT is used as the protocol on field network 2, devices connected to field network 2 share data via a communication frame cyclically transmitted over field network 2. The communication frame including the safety IO data is relayed from one communication slave to another communication slave via standard controller 100 serving as the communication master. Such a relay of the communication frame allows the safety IO data to be exchanged between safety controller 200 and safety slave coupler 300 and between safety controller 200 and safety driver 400.

More specifically, a logical connection can be established between safety controller 200 and safety slave coupler 300 and between safety controller 200 and safety driver 400 using a protocol called FailSafe over EtherCAT (FSoE).

That is, the controller (safety controller 200) serving as the communication slave exchanges data via the controller (standard controller 100) serving as the communication master.

For example, it is assumed that any control target (for example, any production facility) is stopped due to the safety control executed by safety controller 200 (safety operation).

In order to identify the cause of the stop of the control target, support device 600 is connected to safety controller 200, safety program 2104 to be executed on support device 600 is read, process values (variables) managed by safety controller 200 are checked for identifying a safety IO (safety device 350) that is the cause of the stop, and then a necessary measure is taken.

More specifically, the user (maintenance engineer) connects support device 600 to safety controller 200, operates support device 600 to read safety program 2104 (program upload), and starts to monitor the process values (variables) managed by safety controller 200 (variable monitoring). A safety input that makes a safety output False is identified on the basis of safety program 2104 and a result of monitoring the process values. Then, the user operates safety device 350 corresponding to the safety input thus identified to take a measure to restore the safety input.

On the other hand, the operation of connecting support device 600 to safety controller 200 to identify the cause requires a relatively long time and thus may lead to an opportunity loss for the production facility. Therefore, there is a demand for introduction of a mechanism that allows a cause to be identified more quickly.

E. Solution

Next, a solution to a problem as described above that may occur in control system 1 will be described.

Control system 1 according to the present embodiment provides a mechanism capable of presenting, in a simple manner, a control status of the standard control executed by standard controller 100 and/or the safety control executed by safety controller 200 on display device 500. Support device 600 extracts a relationship between an output signal defined by the user program (standard control program 1104 and/or safety program 2104) and one or more input signals and generates input-output correspondence information 570.

More specifically, support device 600 generates input-output correspondence information 570 on the basis of operation logic of standard control program 1104 executed by standard controller 100 and/or safety program 2104 executed by safety controller 200 in the development environment of standard control program 1104 and/or safety program 2104. Support device 600 transmits input-output correspondence information 570 thus generated or screen data reflecting input-output correspondence information 570 to display device 500.

Figure 10:
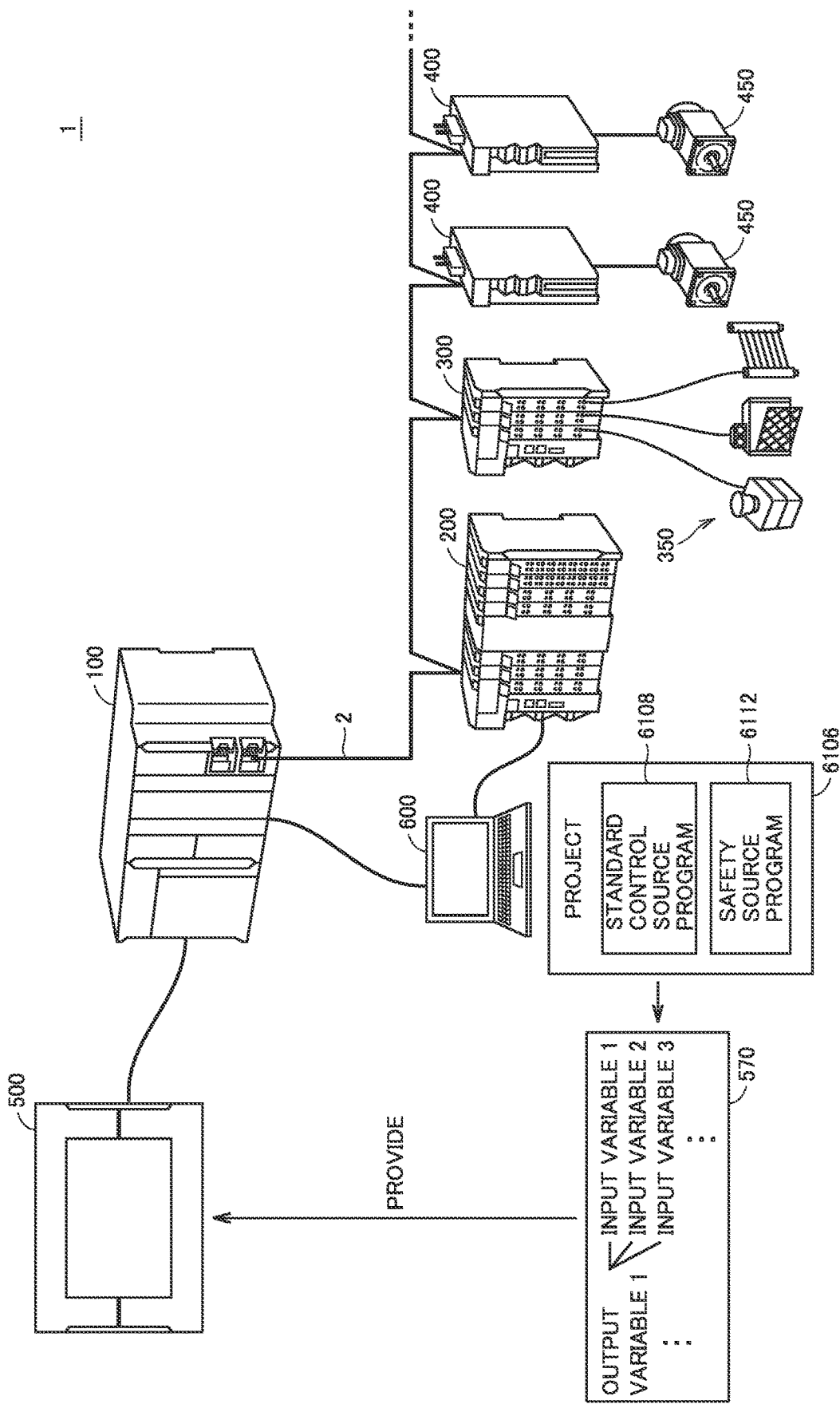
FIG. 10 is a diagram schematically illustrating a solution applied to the control system according to the present embodiment.

Display device 500 provides, on the basis of input-output correspondence information 570 or the screen data reflecting input-output correspondence information 570, the supervisory control screen showing the current value of a selected output signal and the current value of one or more input signals associated with the output signal by referring to the values of input and output signals held by the controller (standard controller 100 and safety controller 200). More specifically, display device 500 provides a screen that allows the control status of the standard control executed by standard controller 100 and/or the safety control executed by safety controller 200 to be checked by referring to input-output correspondence information 570 thus provided FIG. 10 is a diagram schematically illustrating a solution applied to control system 1 according to the present embodiment. With reference to FIG. 10, support device 600 analyzes standard control source program 6108 and/or safety source program 6112 included in project data 6106 and generates input-output correspondence information 570 on the basis of the operation logic included in the program being monitored.

Support device 600 provides a screen that allows the control status to be checked on the basis of input-output correspondence information 570 thus generated.

F. Processing Example and Screen Example

Next, a processing example and a screen example in control system 1 according to the present embodiment will be described.

Figure 11:
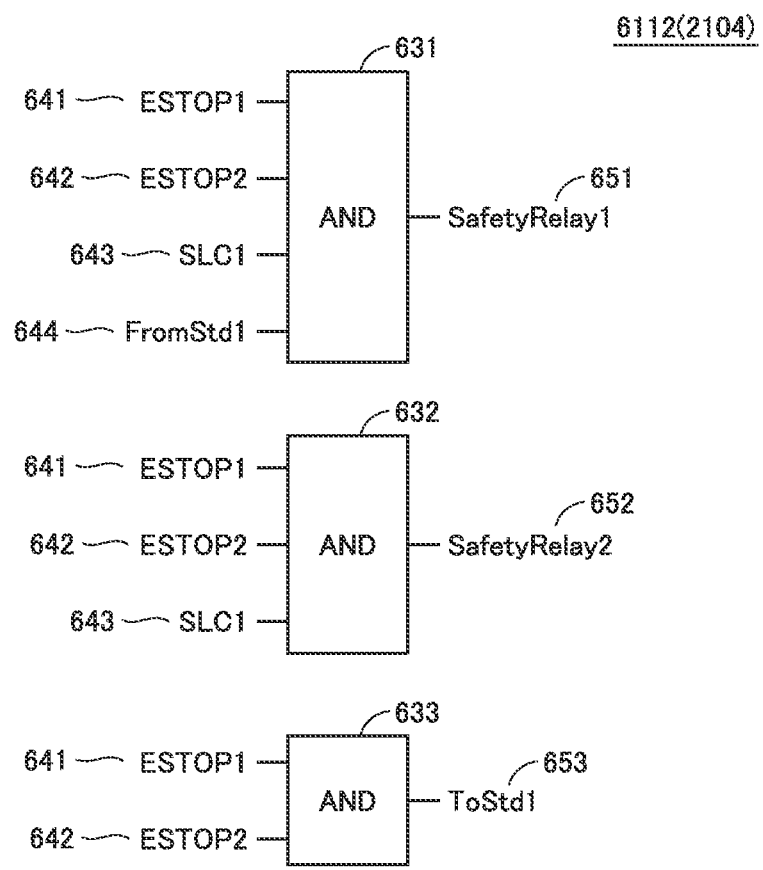
FIG. 11 is a diagram illustrating an example of a program to be analyzed by the control system according to the present embodiment.

FIG. 11 is a diagram illustrating an example of a program to be analyzed by control system 1 according to the present embodiment. FIG. 11 illustrates an example of safety source program 6112 (safety program 2104). In safety source program 6112 illustrated in FIG. 11, operation logic having four input variables 641, 642, 643, 644 as input and three output variables 651, 652, 653 as output is defined.

More specifically, output variable 651 indicating an output signal of "SafetyRelay1" (meaning a safety relay 1) is calculated as a logical AND (AND gate 631) of input variable 641 indicating an input signal of "ESOP1" (meaning an emergency stop switch 1), input variable 642 indicating an input signal of "ESOP2" (meaning an emergency stop switch 2), input variable 643 indicating an input signal of "SLC1" (meaning a light curtain 1), and input variable 644 indicating an input signal of "FromStd1" (meaning input from standard PLC 1).

Further, output variable 652 indicating an output signal of "SafetyRelay2" (meaning a safety relay 2) is calculated as a logical AND (AND gate 632) of input variable 641, input variable 642, and input variable 643.

Further, output variable 653 indicating an output signal of "ToStd1" (meaning output to standard PLC 1) is calculated as a logical AND (AND gate 633) of input variable 641 and input variable 642.

Input-output correspondence information 570 is determined on the basis of the operation logic as illustrated in FIG. 11.

Figure 12:
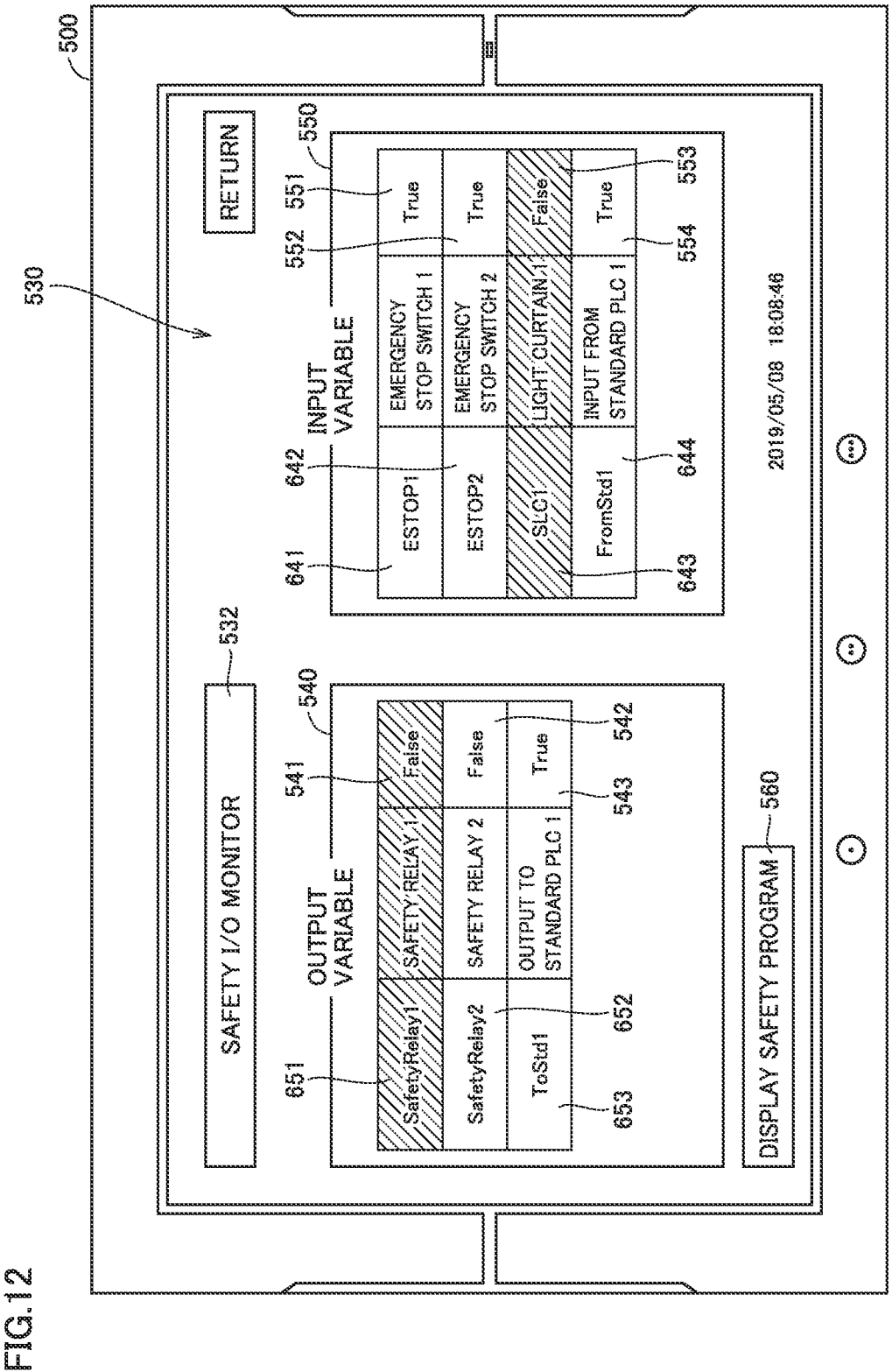
FIG. 12 is a diagram illustrating an example of a monitor screen provided by the display device of the control system according to the present embodiment.
Figure 13:
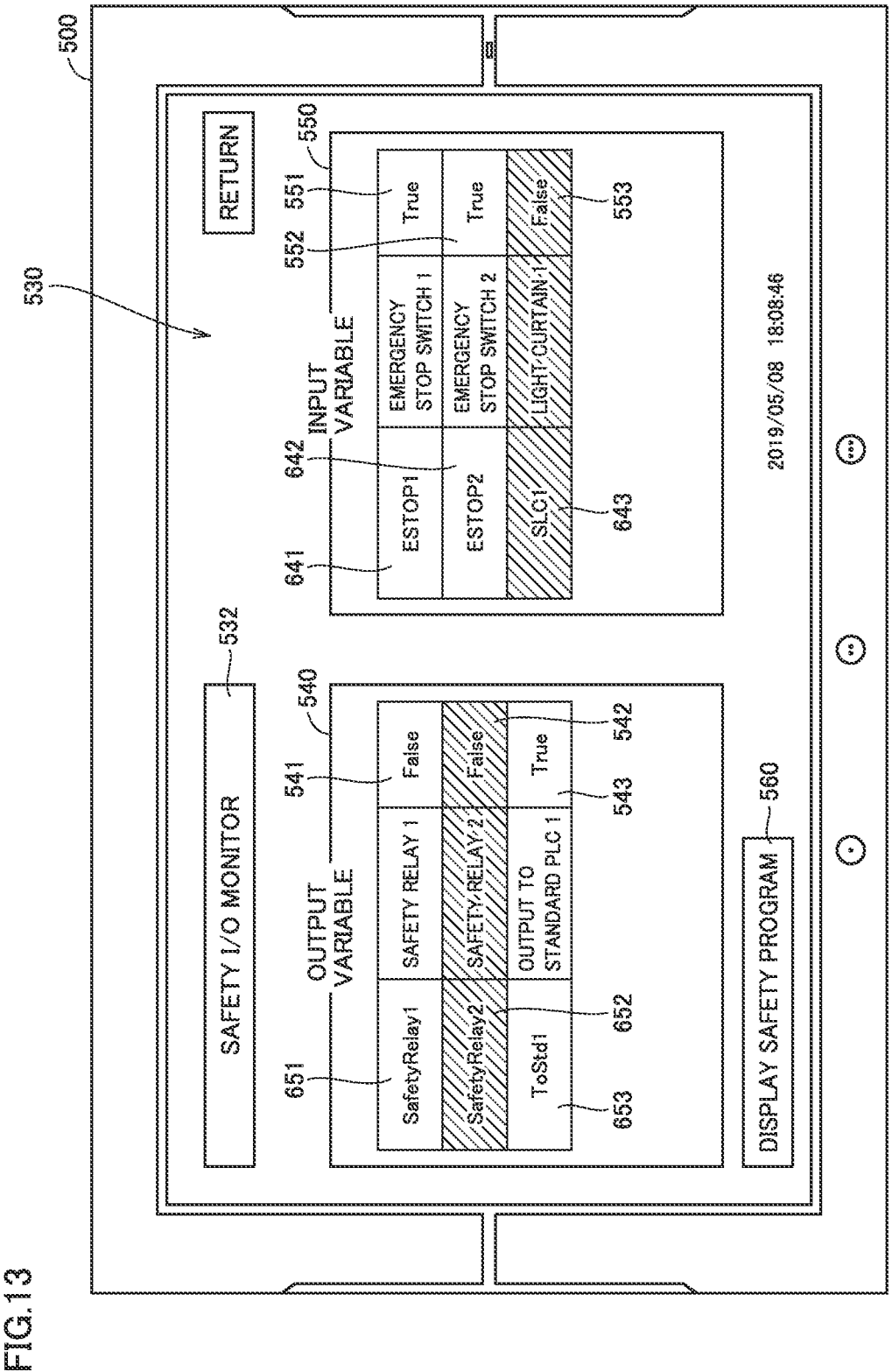
FIG. 13 is a diagram illustrating an example of the monitor screen provided by the display device of the control system according to the present embodiment.

FIGS. 12 and 13 are diagrams each illustrating an example of the monitor screen provided by display device 500 of control system 1 according to the present embodiment.

A monitor screen 530 illustrated in FIGS. 12 and 13 includes an output variable list 540 showing a list of output variables included in the program being monitored, and an input variable list 550 showing a list of input variables included in the program being monitored.

Output variable list 540 includes output variable entries 541, 542, 543 corresponding to output variables 651, 652, 653 illustrated in FIG. 11. Input variable list 550 includes input variable entries 551, 552, 553, 554 corresponding to input variables 641, 642, 643, 644 illustrated in FIG. 11.

Monitor screen 530 includes a target message 532 indicating a program or controller being monitored. The user can identify the program or controller being monitored by referring to the content of target message 532.

When standard control program 1104 and/or safety program 2104 is provided to display device 500, a display button 560 for displaying the content of such a program may be provided.

FIGS. 12 and 13 each illustrate an example where both output variable 651 and output variable 652 are False.

First, in order to identify the cause of making output variable 651 False, the user selects output variable entry 541 corresponding to output variable 651 as illustrated in FIG. 12. This causes input variable entries 551, 552, 553, 554 corresponding to input variables 641, 642, 643, 644 for determining the value of output variable 651 to be displayed in input variable list 550.

The user finds out that input variable 643 is False by referring to the content of input variable entry 553 of input variable list 550 and a display mode different from the others. That is, the user finds out that the cause of making output variable 651 False is due to input variable 643 being False.

Next, in order to identify the cause of making output variable 652 False, the user selects output variable entry 542 corresponding to output variable 652 as illustrated in FIG. 13. This causes input variable entries 551, 552, 553 corresponding to input variables 641, 642, 643 for determining the value of output variable 651 to be displayed in input variable list 550.

The user finds out that input variable 643 is False by referring to the content of input variable entry 553 of input variable list 550 and a display mode different from the others. That is, the user finds out that the cause of making output variable 652 False is due to input variable 643 being False.

As described above, in control system 1 according to the present embodiment, even when any control target stops, the cause of the stop can be identified on display device 500 without connecting support device 600 to standard controller 100 and/or safety controller 200.

As described above, in control system 1 according to the present embodiment, when transferring screen data 5106 to display device 500, support device 600 also transfers input-output correspondence information 570 generated as a result of analysis of standard control source program 6108 and/or safety source program 6112 included in project data 6106. When any control target stops, display device 500 allows the cause of the stop to be easily identified on the basis of input-output correspondence information 570.

More specifically, the user (maintenance engineer) operates support device 600 to transfer input-output correspondence information 570 generated as a result of analysis of standard control source program 6108 and/or safety source program 6112 at the time of transferring screen data 5106 to display device 500. This allows display device 500 to provide information on process values (variables) managed by standard controller 100 and/or safety controller 200.

Thereafter, when any problem occurs, the user (maintenance engineer or facility operator) operates display device 500 to display monitor screen 530 generated on the basis of input-output correspondence information 570. Display device 500 acquires, in response to a user operation, the value of each variable being monitored from a target controller or device in accordance with a definition included in input-output correspondence information 570.

Display device 500 acquires the value of each variable being monitored from a controller or a device using a preset communication command. Then, the user identifies an input variable that makes an output signal False from a relationship between the output variable and the input variables displayed on display device 500. Finally, the user takes a necessary measure on a device or the like to which the input variable thus identified is assigned to restore the input signal.

G. Input-Output Correspondence Information 570

Next, an example of input-output correspondence information 570 used by control system 1 according to the present embodiment will be described.

Figure 14:
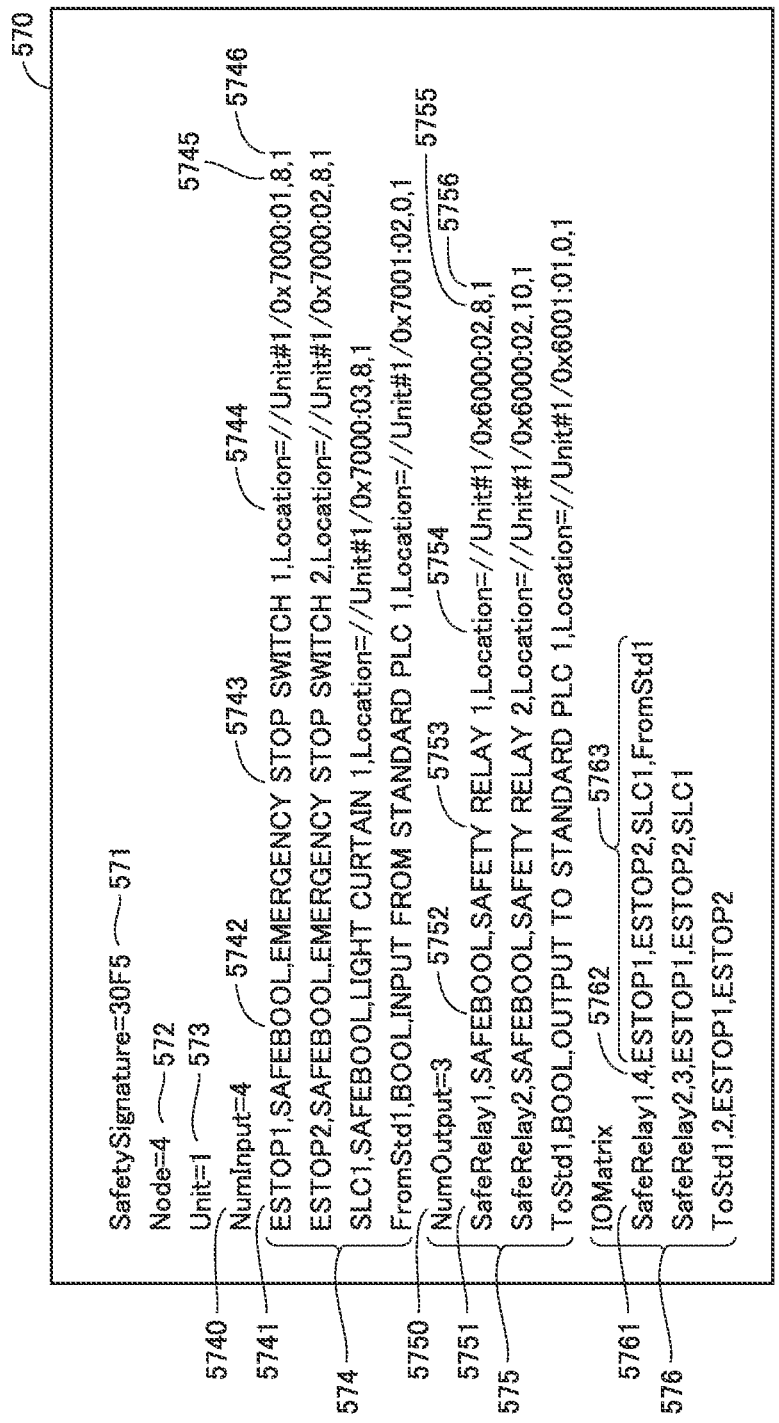
FIG. 14 is a diagram illustrating an example of input-output correspondence information used by the control system according to the present embodiment.

FIG. 14 is a diagram illustrating an example of input-output correspondence information 570 used by control system 1 according to the present embodiment. With reference to FIG. 14, input-output correspondence information 570 includes an input variable definition section 574, an output variable definition section 575, and an association definition section 576. Input-output correspondence information 570 further includes a safety signature 571, target node information 572, and target unit information 573.

Safety signature 571 may be validated when safety controller 200 is set as an object being monitored. Safety signature 571 is information used for ensuring that safety program 2104 executed by safety controller 200 is not falsified, and shows identity with the user program (safety program 2104) executed by safety controller 200. A safety signature assigned in advance at the time of creating safety program 2104 may be used as safety signature 571. Alternatively, a value (for example, a CRC value) calculated from safety program 2104 using a predetermined expression may be used as safety signature 571.

Target node information 572 and target unit information 573 are information used for identifying the controller being monitored in control system 1. Such pieces of information may constitute a part of a reference address. Target node information 572 is used for identifying a location (node address) on field network 2 where the controller being monitored is located. Target unit information 573 is auxiliary information used for identifying the controller being monitored and for identifying a location (unit address) of the unit being monitored among devices (including a plurality of units) specified by target node information 572.

The example illustrated in FIG. 14 shows that a unit having a unit address of "1" of a device located at a node address of "4" is an object being monitored.

Input variable definition section 574 includes a number definition 5740. Input variable definition section 574 further includes, for each variable, a variable name 5741, a data type 5742, a comment 5743, a data location 5744, an offset 5745, and a data length 5746. Such elements are separated by commas and defined for each input variable.

Number definition 5740 starts with "NumInput" and is used for specifying the number of input variables included in input-output correspondence information 570. The example illustrated in FIG. 14 shows that the number of input variables is four.

Variable name 5741 represents a variable name of an input variable such as "ESTOP1".

Data type 5742 represents a data type of an input variable such as "SAFEBOOL" (safety Boolean type).

Comment 5743 represents a comment of a variable such as "emergency stop switch 1".

Data location 5744 represents a reference address such as "Location=//Unit#1/0x7000:01". Data location 5744 may be, for example, a memory address of the target controller.

Offset 5745 is auxiliary information used for accessing an input variable and represents an offset from data location 5744. When a frame of a communication protocol or the like is included in data location 5744, specifying offset 5745 makes it possible to remove unnecessary data.

Data length 5746 represents a length of data to be read as an input variable. Data length 5746 is used for specifying, for example, the number of bits or the number of bytes. Data of a length specified by data length 5746 is read from a start point specified by data location 5744 and offset 5745.

Output variable definition section 575 includes a number definition 5750. Output variable definition section 575 further includes, for each variable, a variable name 5751, a data type 5752, a comment 5753, a data location 5754, an offset 5755, and a data length 5756. Such elements are separated by commas and defined for each output variable.

Number definition 5750 starts with "NumOutput" and is used for specifying the number of output variables included in input-output correspondence information 570. The example illustrated in FIG. 14 shows that the number of output variables is three.

Variable name 5751 represents a variable name of an output variable such as "SafeRelay1".

Data type 5752 represents a data type of an output variable such as "SAFEBOOL" (safety Boolean type).

Comment 5753 represents a comment of a variable such as "safety relay 1".

Data location 5754 represents a reference address such as "Location=//Unit#1/0x6000:02". Data location 5754 may be, for example, a memory address of the target controller.

Offset 5755 is auxiliary information used for accessing an output variable and represents an offset from data location 5754. When a frame of a communication protocol or the like is included in data location 5754, specifying offset 5755 makes it possible to write data to a specific location in the frame.

Data length 5756 represents a length of data to be written as an output variable. Data length 5756 is used for specifying, for example, the number of bits or the number of bytes. Data of a length specified by data length 5756 is write from a start point specified by data location 5754 and offset 5755.

Association definition section 576 starts with "IOMatrix" and is used for specifying one or more input variables associated with each output variable. More specifically, association definition section 576 includes, for each variable, an output variable name 5761, an input variable number 5762, and one or more input variable names 5763. Such elements are separated by commas and defined for each output variable.

Output variable name 5761 is used for specifying a variable name of the target output signal.

Input variable number 5762 is used for specifying the number of input variables associated with the target output variable. Input variable number 5762 is used for specifying the number of input variables input to a logical AND (AND) that determines the value of the target output variable.

Input variable name 5763 is used for specifying a variable name of an input variable associated with the target output variable. The input variable name specified by input variable name 5763 is selected from one or more input variables specified by input variable definition section 574.

The data structure of input-output correspondence information 570 illustrated in FIG. 14 is merely an example, and any data structure may be employed as long as the function explicitly or implicitly described herein can be implemented.

As described above, input-output correspondence information 570 includes addresses (data location 5744 and data location 5754) used for referring to the value of each of the input and output signals, and information (association definition section 576) used for identifying one or more input signals associated with an output signal.

H. Data Transfer

Figure 15:
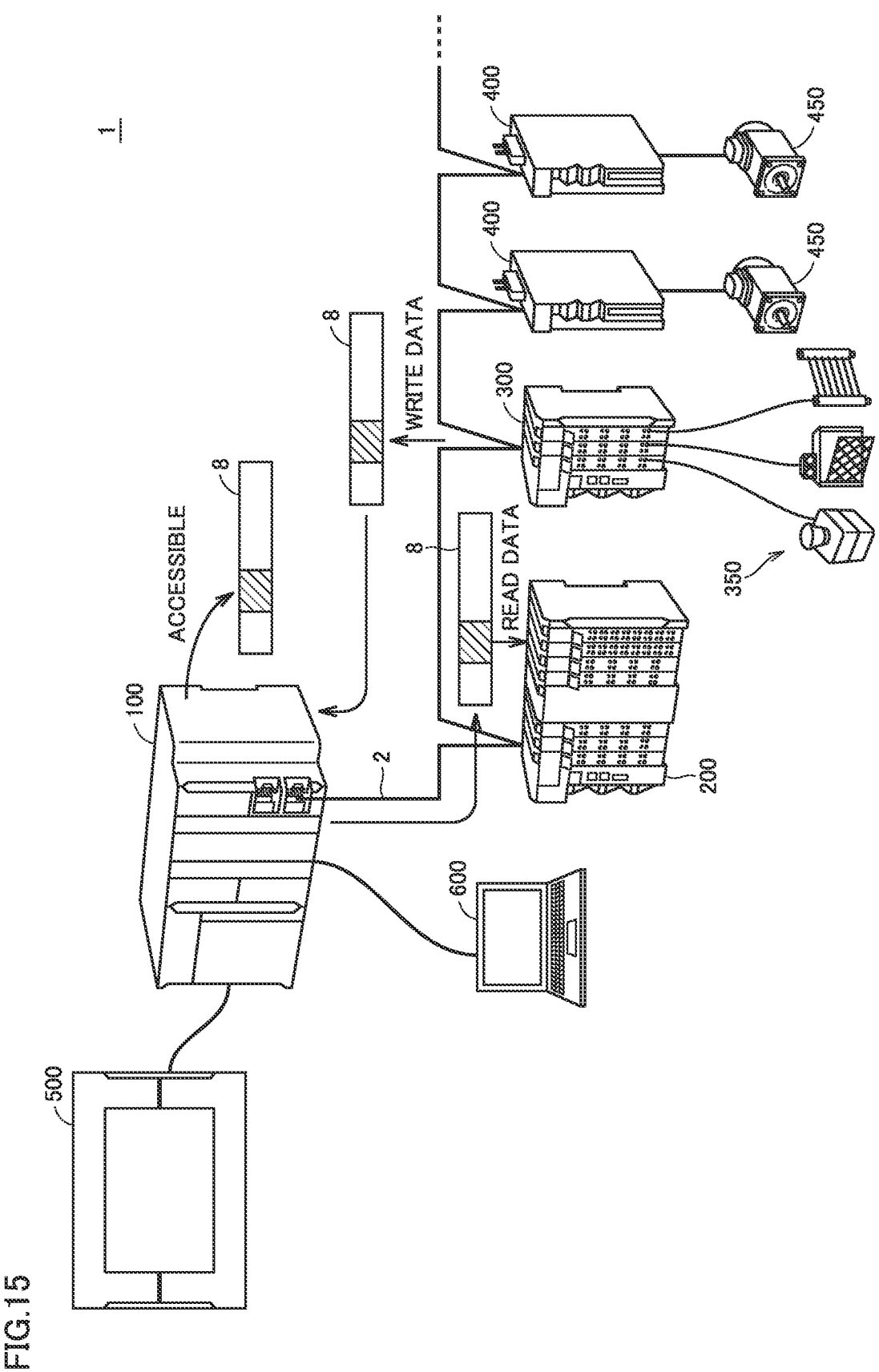
FIG. 15 is a schematic diagram for describing data transfer processing in the control system according to the present embodiment.

Next, data transfer processing in control system 1 according to the present embodiment will be described. FIG. 15 is a schematic diagram for describing data transfer processing in control system 1 according to the present embodiment. With reference to FIG. 15, for example, when EtherCAT is used as the protocol on field network 2, a communication frame 8 is cyclically transferred over field network 2.

For example, input data indicating an input signal that is input from safety device 350 to safety slave coupler 300 is written to communication frame 8 that has arrived at safety device 350 (write data). Communication frame 8 to which the input data has been written is transferred to standard controller 100 and further transferred to safety controller 200. Safety controller 200 reads the input data included in arrived communication frame 8 and executes the safety control.

As described above, since communication frame 8 is transferred via standard controller 100 (the communication master of field network 2), standard controller 100 can refer to (can access) data exchanged between safety slave coupler 300 and safety controller 200.

From display device 500 connected to standard controller 100, not only the process values managed by standard controller 100 but also the process values exchanged between safety slave coupler 300 and safety controller 200 can be referred to (accessed). Note that the FSoE allows data to be exchanged by a command/response method using a plurality of communication frames 8. Even in such a case, it is possible to refer to data exchanged by standard controller 100.

As described above, display device 500 can refer to the values of the input and output signals held by the controller (safety controller 200) serving as the communication slave via the controller (standard controller 100) serving as the communication master.

I. Processing Procedure

Next, a processing procedure in control system 1 according to the present embodiment will be described.

i1: Generation of Input-Output Correspondence Information 570

Figure 16:
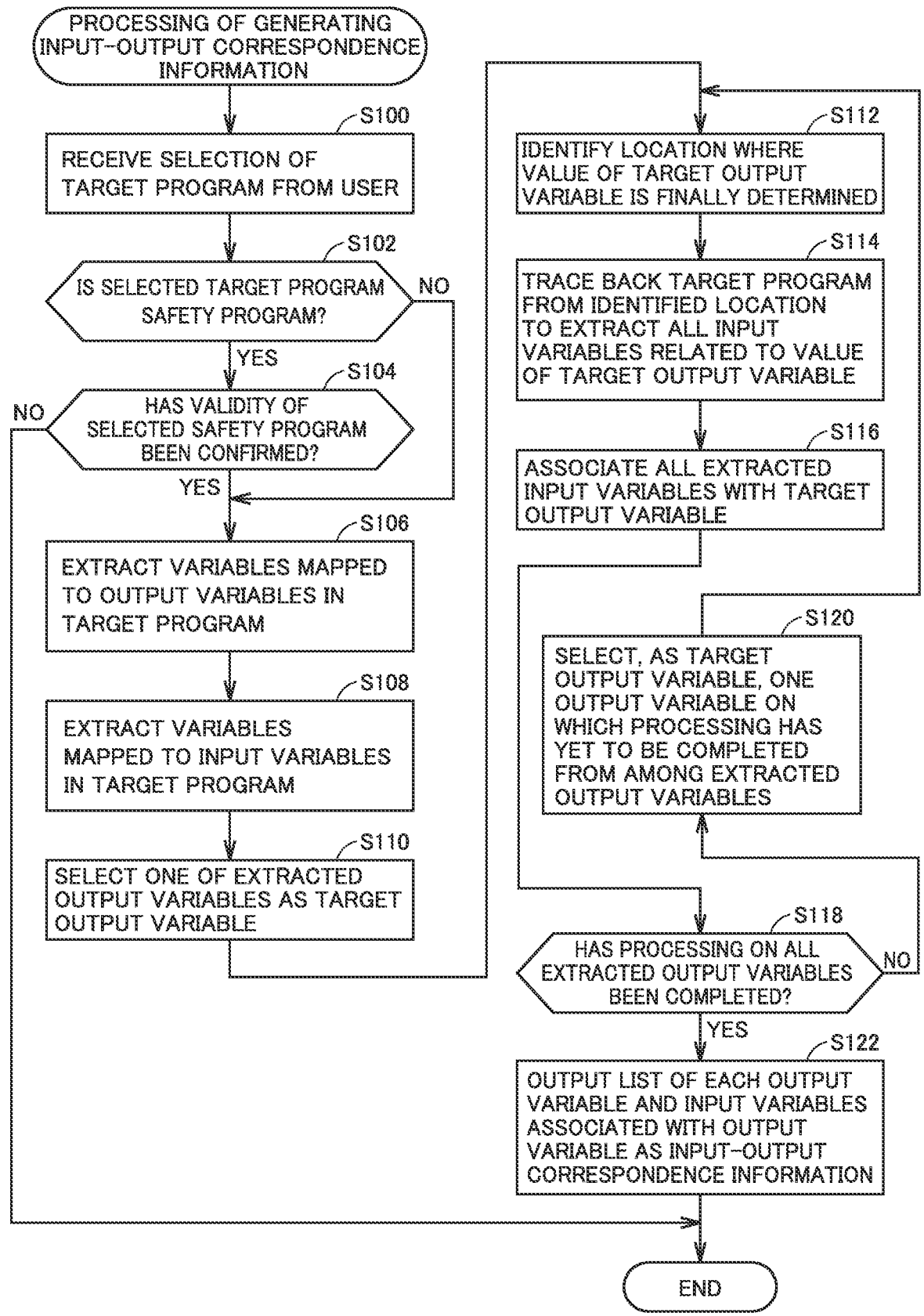
FIG. 16 is a flowchart illustrating a processing procedure of generating the input-output correspondence information in the control system according to the present embodiment.

FIG. 16 is a flowchart illustrating a processing procedure of generating input-output correspondence information 570 in control system 1 according to the present embodiment. Typically, processor 602 of support device 600 runs support program 6104 to execute each step illustrated in FIG. 16.

With reference to FIG. 16, support device 600 receives the selection of the target program (standard control source program 6108 and/or safety source program 6112) from the user (step S100). Support device 600 determines whether the target program thus selected is the safety program (step S102). When the selected target program is the safety program (YES in step S102), support device 600 determines whether the validity of the selected safety program has been confirmed (step S104). When the validity of the selected safety program has yet to be confirmed (NO in step S104), the subsequent processing is canceled.

When the selected target program is not the safety program (NO in step S102) or when the validity of the selected safety program has been confirmed (YES in step S104), support device 600 extracts variables mapped to output variables in the target program (step S106) and extracts variables mapped to input variables in the target program (step S108).

Support device 600 selects one of the output variables extracted in step S106 as a target output variable (step S110). Support device 600 identifies a location where the value of the target output variable is finally set in the target program (step S112), and traces back the target program from the location thus identified to extract all input variables related to the value of the target output variable (step S114). Support device 600 associates all the input variables extracted in step S114 with the target output variable (step S116).

Subsequently, support device 600 determines whether the processing on all the output variables extracted in step S106 has been completed (step S118). When there is an output variable on which the processing has yet to be completed among the extracted output variables (NO in step S118), support device 600 selects, as a target output variable, the output variable on which the processing has yet to be completed from among the extracted output variables (step S120). Support device 600 repeats the processing from step S112.

When the processing on all the output variables extracted in step S106 has been completed (YES in step S118), support device 600 outputs a list of each output variable and input variables associated with the output variable as input-output correspondence information 570 (step S122). Then, the processing of generating input-output correspondence information 570 is brought to an end.

As described above, support device 600 traces back the user program (safety program) for each of the output signals included in the user program to identify one or more input signals for determining the value of the output signal.

i2: Transfer of Input-Output Correspondence Information 570

Figure 17:
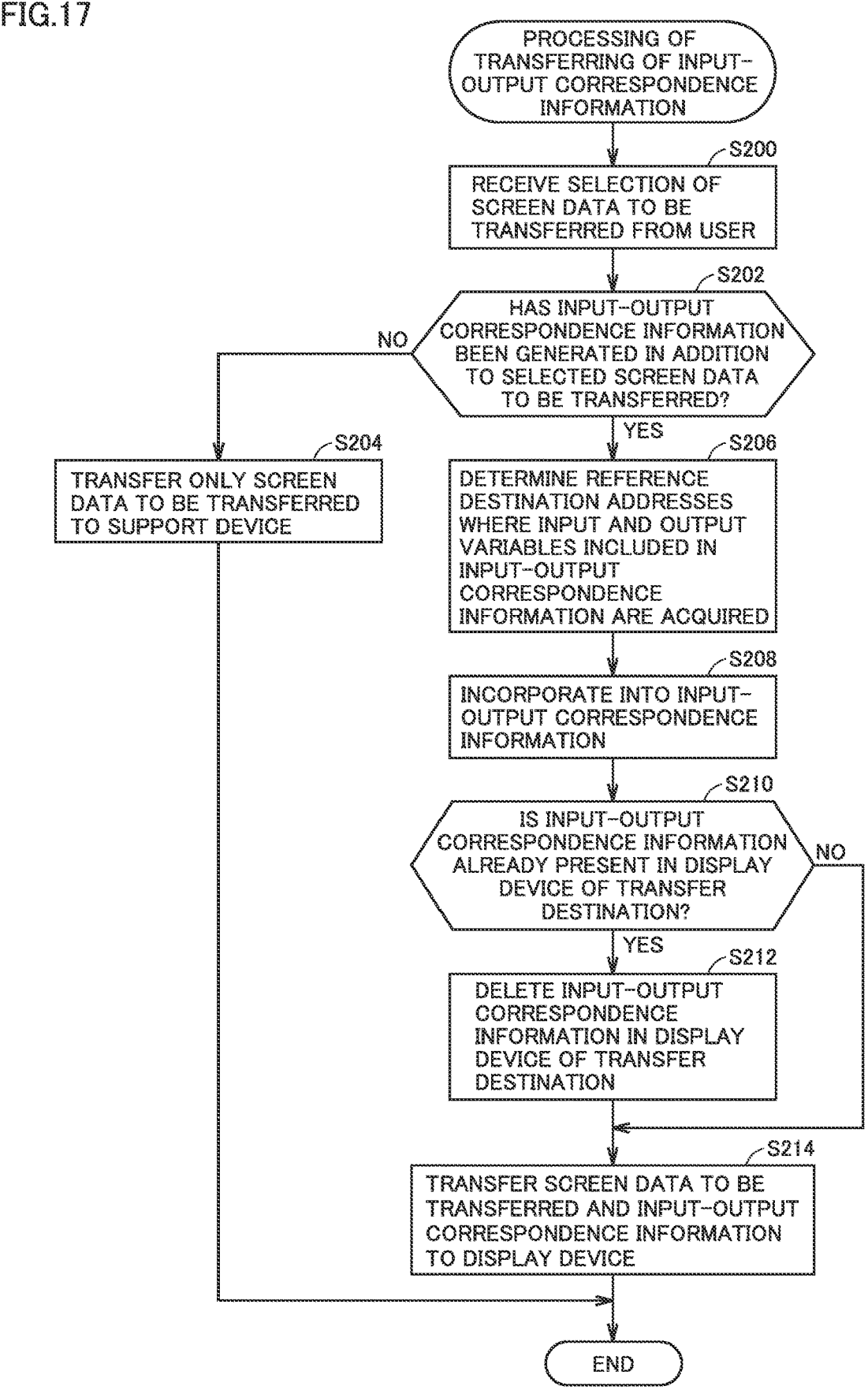
FIG. 17 is a flowchart illustrating a processing procedure of transferring the input-output correspondence information in the control system according to the present embodiment.

FIG. 17 is a flowchart illustrating a processing procedure of transferring input-output correspondence information 570 in control system 1 according to the present embodiment. Typically, processor 602 of support device 600 runs support program 6104 to execute each step illustrated in FIG. 17.

With reference to FIG. 17, support device 600 receives, from the user, the selection of screen data 5106 of the transfer target (step S200). Support device 600 determines whether input-output correspondence information 570 has been generated in addition to selected screen data 5106 of the transfer target (step S202).

When input-output correspondence information 570 has not been generated (NO in step S202), support device 600 transfers, to support device 600, only screen data 5106 of the transfer target (step S204). Then, the processing is brought to an end.

When input-output correspondence information 570 has been generated (YES in step S202), support device 600 refers to standard controller setting information 6110 representing the settings of standard controller 100 and/or safety controller setting information 6114 representing the settings of safety controller 200 to determine reference destination addresses where the input and output variables included in input-output correspondence information 570 are acquired (step S206), and incorporates the reference destination addresses into input-output correspondence information 570 (step S208).

Then, support device 600 determines whether input-output correspondence information 570 is already present in display device 500 of the transfer destination (step S210). When input-output correspondence information 570 is already present in display device 500 of the transfer destination (YES in step S210), support device 600 deletes input-output correspondence information 570 in display device 500 of the transfer destination (step S212).

When no input-output correspondence information 570 is present in display device 500 of the transfer destination (NO in step S210), or after the deletion of input-output correspondence information 570 (step S212), support device 600 transfers screen data 5106 of the transfer target and input-output correspondence information 570 to display device 500 (step S214). As described above, support device 600 transmits input-output correspondence information 570 to display device 500 in addition to screen data 5106 used by display device 500 for providing a desired supervisory control screen. Then, the processing is brought to an end.

i3: Monitor Screen Based on Input-Output Correspondence Information 570

Figure 18:
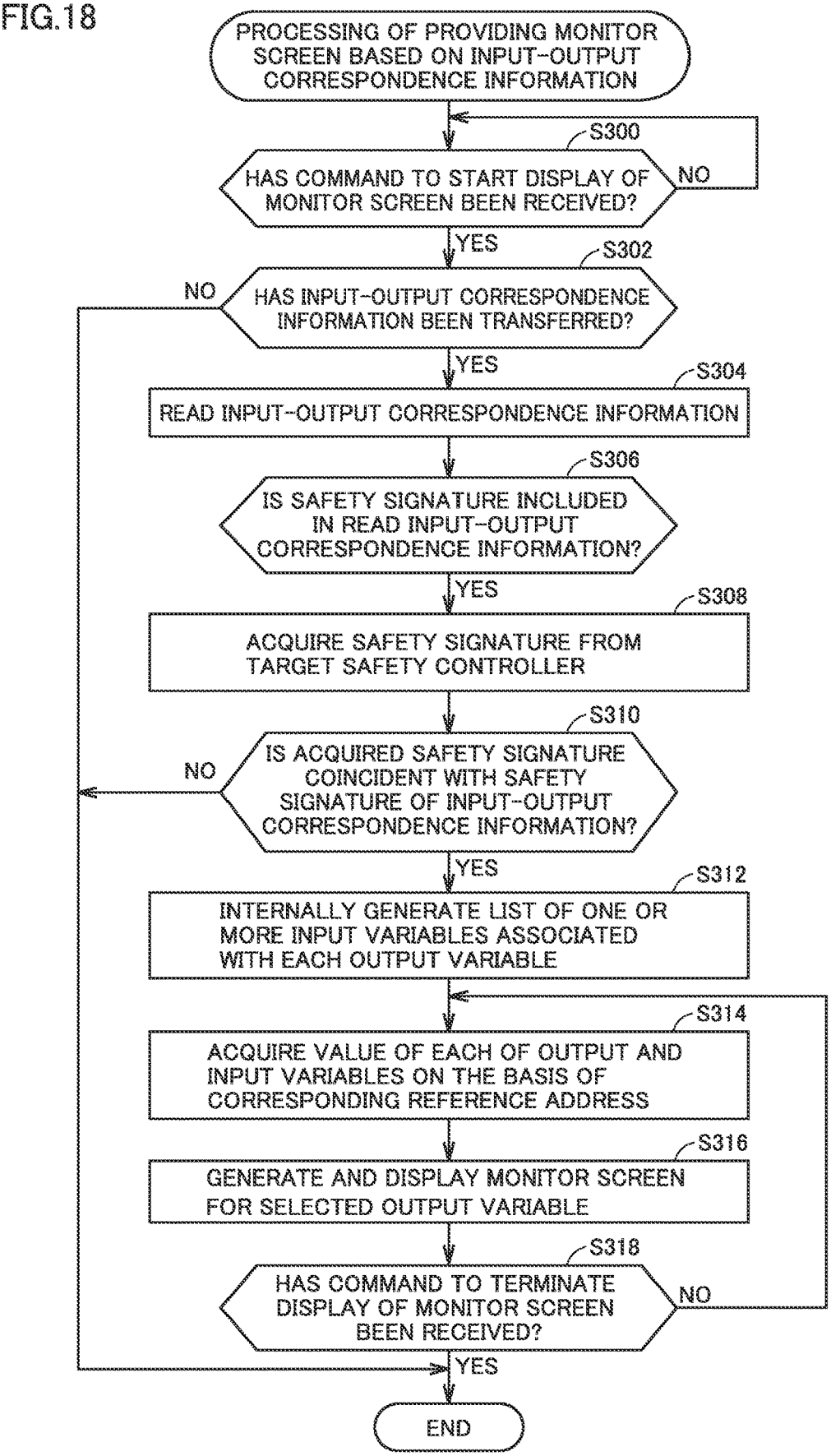
FIG. 18 is a flowchart illustrating a processing procedure of providing the monitor screen using the input-output correspondence information in the control system according to the present embodiment.

FIG. 18 is a flowchart illustrating a processing procedure of providing the monitor screen on the basis of input-output correspondence information 570 in control system 1 according to the present embodiment. Display device 500 generates the supervisory control screen on the basis of input-output correspondence information 570. Typically, processor 502 of display device 500 runs screen generation program 5104 to execute each step illustrated in FIG. 18.

With reference to FIG. 18, upon receipt of a command to start the display of the monitor screen (see FIGS. 12 and 13) (YES in step S300), display device 500 determines whether input-output correspondence information 570 has been transferred (step S302). When input-output correspondence information 570 has not been transferred (NO in step S302), the processing is brought to an end.

When input-output correspondence information 570 has been transferred (YES in step S302), display device 500 reads input-output correspondence information 570 (step S304) and determines whether a safety signature is included in input-output correspondence information 570 thus read (step S306).

When a safety signature is included in read input-output correspondence information 570 (YES in step S306), display device 500 acquires a safety signature from target safety controller 200 (step S308) and determines whether the safety signature thus acquired coincides with the safety signature of input-output correspondence information 570 (step S310). When the acquired safety signature does not coincide with the safety signature of input-output correspondence information 570 (NO in step S310), the processing is brought to an end.

When the acquired safety signature coincides with the safety signature of input-output correspondence information 570 (YES in step S310), display device 500 internally generates a list of one or more input variables associated with each output variable on the basis of read input-output correspondence information 570 (step S312).

Then, display device 500 acquires the value of each of the output and input variables on the basis of a corresponding reference address with reference to the list thus generated (step S314), and generates and displays a monitor screen for the selected output variable (step S316). As described above, the screen data reflecting input-output correspondence information 570 is structured to show the current value of one or more input signals associated with any selected output signal generated on the basis of input-output correspondence information 570.

Display device 500 determines whether a command to terminate the display of the monitor screen has been received (step S318). When the command to terminate the display of the monitor screen has not been received (NO in step S318), step S314 and the subsequent steps are repeatedly executed.

When the command to terminate the display of the monitor screen has been received (YES in step S318), display device 500 terminates the processing.

J. Modification j1: Function Sharing

The above description shows an example where support device 600 is responsible for generating input-output correspondence information 570, and display device 500 is responsible for storing generated input-output correspondence information 570 and generating the monitor screen on the basis of input-output correspondence information 570, but the present invention is not limited to such an example, and each function may be implemented as desired.

That is, (1) the function of generating input-output correspondence information 570, (2) the function of storing generated input-output correspondence information 570, and (3) the function of generating the monitor screen on the basis of input-output correspondence information 570 may be assigned to any device in control system 1.

Note that (2) the function of storing generated input-output correspondence information 570 and (3) the function of generating the monitor screen on the basis of input-output correspondence information 570 may be combined to generate the monitor screen including information on the association of the variable values included in input-output correspondence information 570. In this case, (2) the function of storing the generated input-output correspondence information 570 is merged with (3) the function of generating the monitor screen on the basis of input-output correspondence information 570.

FIG. 19 is a diagram illustrating an example of function sharing in control system 1 according to the present embodiment. FIG. 19 illustrates eight, that is Nos. 1 to 8, function sharing examples.

The function sharing example of No. 1 corresponds to the above-described embodiment. Display device 500 generates monitor screen 530 on the basis of input-output correspondence information 570.

The function sharing example of No. 2 corresponds to a mode where input-output correspondence information 570 is stored in safety controller 200 rather than display device 500. Display device 500 reads input-output correspondence information 570 from safety controller 200, and generates monitor screen 530 on the basis of input-output correspondence information 570 thus read.

The function sharing example of No. 3 is similar to the function sharing example of No. 2 and corresponds to a mode where input-output correspondence information 570 is stored in standard controller 100 rather than display device 500. Display device 500 reads input-output correspondence information 570 from standard controller 100, and generates monitor screen 530 on the basis of input-output correspondence information 570 thus read.

The function sharing example of No. 4 is implemented using an integrated controller that is a combination of standard controller 100 and display device 500 in one. In this function sharing example, the integrated controller is responsible for storing input-output correspondence information 570 and generating monitor screen 530.

The function sharing examples of Nos. 5 to 7 correspond to a configuration where (2) the function of storing generated input-output correspondence information 570 is merged with (3) the function of generating the monitor screen on the basis of input-output correspondence information 570.

More specifically, in the function sharing example of No. 5, support device 600 generates both input-output correspondence information 570 and screen data reflecting input-output correspondence information 570. Display device 500 provides monitor screen 530 on the basis of the screen data reflecting input-output correspondence information 570.

Further, in the function sharing example of No. 6, support device 600 generates both input-output correspondence information 570 and screen data reflecting input-output correspondence information 570. The integrated controller provides monitor screen 530 on the basis of the screen data reflecting input-output correspondence information 570.

Further, in the function sharing example of No. 7, display device 500 itself generates both input-output correspondence information 570 and screen data reflecting input-output correspondence information 570. Display device 500 provides monitor screen 530 on the basis of the screen data reflecting input-output correspondence information 570.

In the function sharing example of No. 8, safety controller 200 generates input-output correspondence information 570 and stores input-output correspondence information 570 thus generated. Display device 500 reads input-output correspondence information 570 from safety controller 200, and generates monitor screen 530 on the basis of input-output correspondence information 570 thus read.

Note that the function sharing examples illustrated in FIG. 19 are merely examples, and any function sharing may be employed according to a control system to be implemented.

j2: Addition of Field Network

Although FIG. 2 illustrates a configuration where control system 1 includes field network 2, even a configuration where control system 1 further includes another field network can provide the monitor screen as described above.

Figure 20:
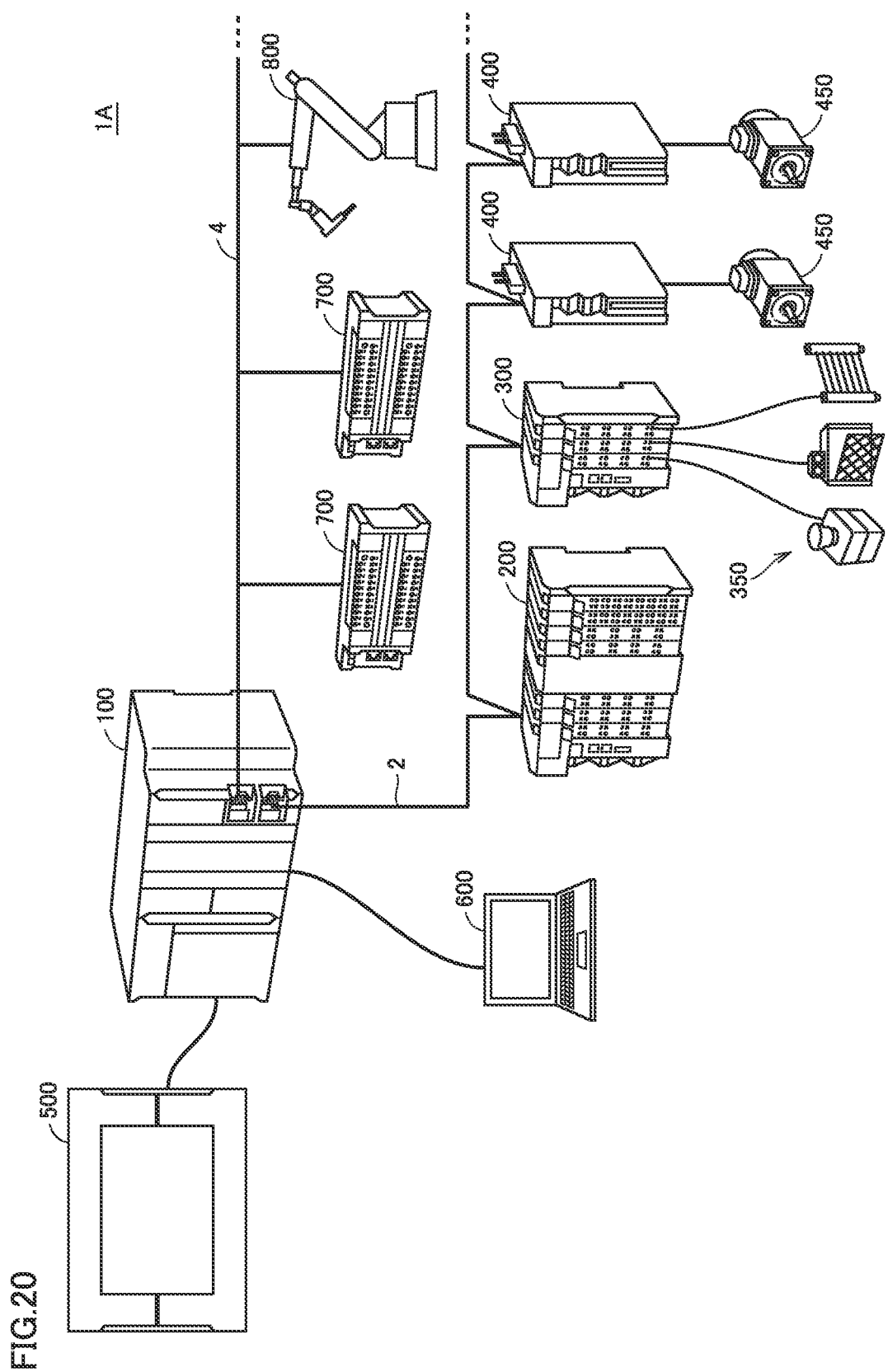
FIG. 20 is a diagram schematically illustrating an example of a configuration of a control system according to a modification of the present embodiment.

FIG. 20 is a diagram schematically illustrating an example of a configuration of a control system 1A according to a modification of the present embodiment. With reference to FIG. 20, control system 1A includes a field network 4 in addition to field network 2. Standard controller 100 can perform data communication with one or more safety IO terminals 700 and a robot 800 over field network 2.

A protocol used on field network 4 may be the same as or different from the protocol used on field network 2. Examples of the different protocol may include EtherNet/IP.

As described above, the monitor screen according to the present embodiment can be made by the control system having a desired configuration.

K. Appendix

The present embodiment as described above includes the following technical ideas.

[Configuration 1]
A control system (1) including
a support device (600) used for developing a user program to be executed on a controller (100, 200), and
a display device (500) configured to provide a supervisory control screen by referring to information held by the controller, wherein
the support device includes a generation means (S100 to S122) configured to extract a relationship between an output signal and one or more input signals defined by the user program and generate input-output correspondence information (570), and a transmission means (S200 to S214) configured to transmit the input-output correspondence information or screen data reflecting the input-output correspondence information to the display device, and
the display device provides, on the basis of the input-output correspondence information or the screen data reflecting the input-output correspondence information, the supervisory control screen showing a current value of a selected output signal and a current value of one or more input signals associated with the output signal by referring to values of input and output signals held by the controller (S300 to S318).

[Configuration 2]
The control system according to configuration 1, wherein
the input-output correspondence information includes an address (5744, 5754) used for referring to a value of a corresponding one of the input and output signals, and information (576) used for identifying the one or more input signals associated with the output signal.

[Configuration 3]
The control system according to configuration 1 or 2, wherein
the display device includes a screen generation means (S316) configured to generate the supervisory control screen on the basis of the input-output correspondence information.

[Configuration 4]
The control system according to any one of configurations 1 to 3, wherein
the transmission means transmits the input-output correspondence information in addition to the screen data used for providing a desired supervisory control screen on the display device (S214).

[Configuration 5]
The control system according to any one of configurations 1 to 4, wherein
the screen data reflecting the input-output correspondence information is structured to show a current value of one or more input signals associated with any selected output signal generated on the basis of the input-output correspondence information.

[Configuration 6]
The control system according to any one of configurations 1 to 5, wherein
the controller includes a safety controller (200), and
the input-output correspondence information includes a safety signature (571) showing identity with a user program executed on the safety controller.

[Configuration 7]
The control system according to any one of configurations 1 to 6, wherein
the generation means traces back the user program to identify, for each output signal included in the user program, one or more input signals for determining a value of the output signal.

[Configuration 8]
The control system according to any one of configurations 1 to 7, wherein
a controller (200) serving as a communication slave exchanges data via a controller (100) serving as a communication master, and
the display device refers to values of input and output signals held by the controller serving as the communication slave via the controller serving as the communication master.

[Configuration 9]
A support device (600) used for developing a user program to be executed on a controller (100, 200), the controller being connected with a display device (500) configured to provide a supervisory control screen by referring to information held by the controller, the support device including:
a generation means (S100 to S122) configured to extract a relationship between an output signal and one or more input signals defined by the user program and generate input-output correspondence information (570); and
a transmission means (S200 to S214) configured to transmit the input-output correspondence information or screen data reflecting the input-output correspondence information to the display device, wherein
the display device provides, on the basis of the input-output correspondence information or the screen data reflecting the input-output correspondence information, the supervisory control screen showing a current value of a selected output signal and a current value of one or more input signals associated with the output signal by referring to values of input and output signals held by the controller (S300 to S318).

[Configuration 10]

A support program (6104) used for developing a user program to be executed on a controller (100, 200), the controller being connected with a display device (500) configured to provide a supervisory control screen by referring to information held by the controller, the support program causing a computer to execute:

extracting a relationship between an output signal and one or more input signals defined by the user program and generating input-output correspondence information (570) (S100 to S122); and transmitting the input-output correspondence information or screen data reflecting the input-output correspondence information to the display device (S200 to S214), wherein the display device provides, on the basis of the input-output correspondence information or the screen data reflecting the input-output correspondence information, the supervisory control screen showing a current value of a selected output signal and a current value of one or more input signals associated with the output signal by referring to values of input and output signals held by the controller (S300 to S318).

L. Advantages

Control system 1 according to the present embodiment can present a list of input signals associated with a stopped output signal and their current values on the display device, for example, when a device of a production facility or the like is stopped by a safety function. It is therefore possible to easily identify an input signal that has caused the facility to stop by referring to the information thus presented. In most cases, the cause can be found only with the display device, so that it is not necessary to connect the support device or the like to the controller, which in turn allows quick recovery.

It should be understood that the embodiment disclosed herein is illustrative in all respects and not restrictive. The scope of the present invention is defined by the claims rather than the above description, and the present invention is intended to include the claims, equivalents of the claims, and all modifications within the scope.

REFERENCE SIGNS LIST 1, 1A: control system, 2, 4: field network, 8: communication frame, 100: standard controller, 102, 202, 302, 412, 414, 502, 602: processor, 104, 204, 304, 416, 504, 604: main memory, 106: host network controller, 108, 208, 308, 402: field network controller, 110, 210, 310, 420, 510, 610: storage, 112, 512: memory card interface, 114, 514: memory card, 116: local bus controller, 118, 218, 318, 518, 618: processor bus, 120, 220, 620: controller, 200: safety controller, 216, 316: safety local bus controller, 230, 330: unit, 300: safety slave coupler, 350: safety device, 400: safety driver, 410: control unit, 430: drive circuit, 432: feedback receiving circuit, 450: servomotor, 452: three-phase AC motor, 454: encoder, 500: display device, 506, 606: input unit, 508: display unit, 520: communication controller, 530: monitor screen, 532: target message, 540: output variable list, 541, 542, 543: output variable entry, 550: input variable list, 551, 552, 553, 554: input variable entry, 560: display button, 570: input-output correspondence information, 571: safety signature, 572: target node information, 573: target unit information, 574: input variable definition section, 575: output variable definition section, 576: association definition section, 600: support device, 608: output unit, 612: optical drive, 614: storage medium, 631, 632, 633: gate, 641, 642, 643, 644: input variable, 651, 652, 653: output variable, 700: terminal, 5746, 5756: data length, 800: robot, 1102, 2102, 3102: system program, 1104: standard control program, 1106, 2106, 3106, 4206: setting information, 2104: safety program, 4202: servo control program, 4204: motion safety program, 5104: screen generation program, 5106: screen data, 5740, 5750: number definition, 5741, 5751: variable name, 5742, 5752: data type, 5743, 5753: comment, 5744, 5754: data location, 5745, 5755: offset, 5761: output variable name, 5762: input variable number, 5763: input variable name, 6104: support program, 6106: project data, 6108: standard control source program, 6110: standard controller setting information, 6112: safety source program, 6114: safety controller setting information, 6116: safety driver setting information

The invention claimed is:

1. A control system comprising:
a support device used for developing a user program to be executed on a controller; and
a display device configured to provide a supervisory control screen by referring to information held by the controller,
wherein
the controller includes a safety controller,
the support device is configured to at least:
extract a relationship between an output signal and one or more input signals defined by the user program and generate input-output correspondence information, and
transmit the input-output correspondence information or screen data reflecting the input-output correspondence information to the display device,
the display device provides, based on the input-output correspondence information or the screen data reflecting the input-output correspondence information, the supervisory control screen showing a current value of a selected output signal and a current value of one or more input signals associated with the selected output signal by referring to values of input and output signals held by the controller, and
the input-output correspondence information includes a safety signature showing an identity with the user program executed on the safety controller.

2. The control system according to claim 1, wherein the input-output correspondence information includes an address used for referring to a value of a corresponding one of the input and output signals, and information used for identifying the one or more input signals associated with the output signal.

3. The control system according to claim 1, wherein the display device is configured to generate the supervisory control screen based on the input-output correspondence information.

4. The control system according to claim 1, wherein the support device is configured to transmit the input-output correspondence information in addition to the screen data used for providing a desired supervisory control screen on the display device.

5. The control system according to claim 1, wherein the screen data reflecting the input-output correspondence information is structured to show the current value of one or more input signals associated with the selected output signal generated based on the input-output correspondence information.

6. The control system according to claim 1, wherein
the support device is configured to trace back the user program to identify, for each output signal included in the user program, the one or more input signals for determining a value of the output signal.

7. The control system according to claim 1, wherein;
a controller serving as a communication slave exchanges data via a controller serving as a communication master, and
the display device refers to values of the input and output signals held by the controller serving as the communication slave via the controller serving as the communication master.

8. A support device used for developing a user program to be executed on a controller, the controller being connected with a display device configured to provide a supervisory control screen by referring to information held by the controller, the controller including a safety controller, the support device being configured to at least:
  extract a relationship between an output signal and one or more input signals defined by the user program and generate input-output correspondence information; and
  transmit the input-output correspondence information or screen data reflecting the input-output correspondence information to the display device,
  wherein
    the display device provides, based on the input-output correspondence information or the screen data reflecting the input-output correspondence information, the supervisory control screen showing a current value of a selected output signal and a current value of one or more input signals associated with the output signal by referring to values of input and output signals held by the controller, and
  the input-output correspondence information includes a safety signature showing identity with the user program executed on the safety controller.

9. A non-transitory storage medium having a support program stored thereon that is used for developing a user program to be executed on a controller, the controller being connected with a display device configured to provide a supervisory control screen by referring to information held by the controller, the controller including a safety controller, the support program causing one or more processors to perform at least:
  extracting a relationship between an output signal and one or more input signals defined by the user program and generating input-output correspondence information; and
  transmitting the input-output correspondence information or screen data reflecting the input-output correspondence information to the display device,
  wherein
    the display device provides, based on the input-output correspondence information or the screen data reflecting the input-output correspondence information, the supervisory control screen showing a current value of a selected output signal and a current value of one or more input signals associated with the output signal by referring to values of input and output signals held by the controller, and
  the input-output correspondence information includes a safety signature showing identity with the user program executed on the safety controller.

10. The support device according to claim 8, wherein
the input-output correspondence information includes an address used for referring to a value of a corresponding one of the input and output signals, and information used for identifying the one or more input signals associated with the output signal.

11. The support device according to claim 8, wherein
the display device is configured to generate the supervisory control screen based on the input-output correspondence information.

12. The support device according to claim 8, wherein
the support device is configured to transmit the input-output correspondence information in addition to the screen data used for providing a desired supervisory control screen on the display device.

13. The support device according to claim 8, wherein
the screen data reflecting the input-output correspondence information is structured to show the current value of one or more input signals associated with the selected output signal generated based on the input-output correspondence information.

14. The non-transitory storage medium according to claim 9, wherein
the input-output correspondence information includes an address used for referring to a value of a corresponding one of the input and output signals, and information used for identifying the one or more input signals associated with the output signal.

15. The non-transitory storage medium according to claim 9, wherein
the display device is configured to generate the supervisory control screen based on the input-output correspondence information.

16. The non-transitory storage medium according to claim 9, wherein
the support program causes the one or more processors to perform transmitting the input-output correspondence information in addition to the screen data used for providing a desired supervisory control screen on the display device.

17. The non-transitory storage medium according to claim 9, wherein
the screen data reflecting the input-output correspondence information is structured to show the current value of one or more input signals associated with ahe selected output signal generated based on the input-output correspondence information.

18. The support device according to claim 8, wherein the support device is configured to trace back the user program to identify, for each output signal included in the user program, the one or more input signals for determining a value of the output signal.

19. The non-transitory storage medium according to claim 9, wherein the support program causes the one or more processors to perform tracing back the user program to identify, for each output signal included in the user program, the one or more input signals for determining a value of the output signal.

* * * * *